(12) United States Patent
Luo et al.

(10) Patent No.: US 12,073,524 B2
(45) Date of Patent: Aug. 27, 2024

(54) GENERATING AUGMENTED REALITY CONTENT BASED ON THIRD-PARTY CONTENT

(71) Applicant: Snap Inc., Santa Monica, CA (US)

(72) Inventors: Jean Luo, Seattle, WA (US); Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/321,521

(22) Filed: May 22, 2023

(65) Prior Publication Data

US 2023/0377291 A1    Nov. 23, 2023

Related U.S. Application Data

(62) Division of application No. 16/885,714, filed on May 28, 2020, now Pat. No. 11,657,575.

(51) Int. Cl.
| | |
|---|---|
| *G06T 19/00* | (2011.01) |
| *G06Q 30/0601* | (2023.01) |
| *G06Q 50/00* | (2012.01) |
| *G06T 19/20* | (2011.01) |
| *G06V 10/44* | (2022.01) |
| *G06V 40/16* | (2022.01) |
| *H04L 51/07* | (2022.01) |

(52) U.S. Cl.
CPC ....... *G06T 19/006* (2013.01); *G06Q 30/0643* (2013.01); *G06Q 50/01* (2013.01); *G06T 19/20* (2013.01); *G06V 10/443* (2022.01); *G06V 40/168* (2022.01); *H04L 51/07* (2022.05); *G06T 2219/2012* (2013.01)

(58) Field of Classification Search
CPC ............... G06T 19/006; G06T 19/20; G06T 2219/2012; G06Q 30/0643; G06Q 50/01; G06V 10/443; G06V 40/168; H04L 51/07
See application file for complete search history.

(56) References Cited

U.S. PATENT DOCUMENTS 10,861,248 B2    12/2020    Scapel et al.
11,055,583 B1    7/2021    Cosic
(Continued)

FOREIGN PATENT DOCUMENTS

| CN | 115699095 A | 2/2023 |
|---|---|---|
| JP | 2007213623 A | 8/2007 |

(Continued)

OTHER PUBLICATIONS

"U.S. Appl. No. 16/885,714, Amendment Under 37 CFR § 1.312 Filed Apr. 11, 2023", 8 pgs.
(Continued)

*Primary Examiner* — Chong Wu
(74) *Attorney, Agent, or Firm* — Schwegman Lundberg & Woessner, P.A.

(57) ABSTRACT

In one or more implementations, third-party content may include one or more objects and may include one or more visual effects related to the one or more objects. Augmented reality content may be generated that applies the one or more visual effects to additional object shown in a field of view of a camera. The third-party content may correspond to one or more products that are available for purchase via a client application.

20 Claims, 11 Drawing Sheets

(56) References Cited

U.S. PATENT DOCUMENTS

| | | | |
|---|---|---|---|
| 11,657,575 | B2 | 5/2023 | Luo et al. |
| 2019/0087842 | A1* | 3/2019 | Koenig .................. A63F 13/61 |
| 2021/0345016 | A1 | 11/2021 | Nakano et al. |
| 2021/0374839 | A1 | 12/2021 | Luo et al. |

FOREIGN PATENT DOCUMENTS

| | | |
|---|---|---|
| KR | 20150093930 A | 8/2015 |
| KR | 20170065186 A | 6/2017 |
| WO | WO-2021242765 A1 | 12/2021 |

OTHER PUBLICATIONS

"U.S. Appl. No. 16/885,714, Non Final Office Action mailed Jul. 21, 2022", 20 pgs.

"U.S. Appl. No. 16/885,714, Notice of Allowance mailed Jan. 11, 2023", 8 pgs.

"U.S. Appl. No. 16/885,714, PTO Response to Rule 312 Communication mailed Apr. 19, 2023", 2 pgs.

"U.S. Appl. No. 16/885,714, Response filed May 17, 2022 to Restriction Requirement mailed Mar. 17, 2022", 9 pgs.

"U.S. Appl. No. 16/885,714, Response filed Oct. 21, 2022 to Non Final Office Action mailed Jul. 21, 2022", 11 pgs.

"U.S. Appl. No. 16/885,714, Restriction Requirement mailed Mar. 17, 2022", 6 pgs.

"International Application Serial No. PCT/US2021/034067, International Preliminary Report on Patentability mailed Dec. 8, 2022", 9 pgs.

"International Application Serial No. PCT/US2021/034067, International Search Report mailed Sep. 3, 2021", 6 pgs.

"International Application Serial No. PCT/US2021/034067, Written Opinion mailed Sep. 3, 2021", 10 pgs.

Javornik, Ana, et al., "Revealing the Shopper Experience Using a "Magic Mirror" Augmented Reality Make-Up Application", Designing Interactive Systems, ACM, NY, USA, (Jun. 4, 2016), 871-882.

Oliveira, Almeida Dicksson Rammon, et al., "Interactive Makeup Tutorial Using Face Tracking and Augmented Reality on Mobile Devices", 2015 XVII Symposium on Virtual and Augmented Reality, IEEE, (May 25, 2015), 220-226.

U.S. Appl. No. 16/885,714 U.S. Pat. No. 11,657,575, filed May 28, 2020, Generating Augmented Reality Content Based on Third-Party Content.

"Korean Application Serial No. 10-2022-7045678, Notice of Preliminary Rejection mailed Dec. 18, 2023", w/ English translation, 9 pgs.

\* cited by examiner

GENERATING AUGMENTED REALITY CONTENT BASED ON THIRD-PARTY CONTENT

CROSS-REFERENCE TO RELATED APPLICATION

This application is a division of U.S. patent application Ser. No. 16/885,714, filed May 28, 2020, which is incorporated by reference herein in its entirety.

BACKGROUND

Applications executed by client devices may be used to generate content. For example, client applications may be used to generate messaging content, image content, video content, audio content, media overlays, documents, creative works, combinations thereof, and the like. In various situations, client applications may combine content from multiple sources to produce a modified version of the original content.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some implementations are illustrated by way of example, and not limitation.

DETAILED DESCRIPTION

Figure 1:
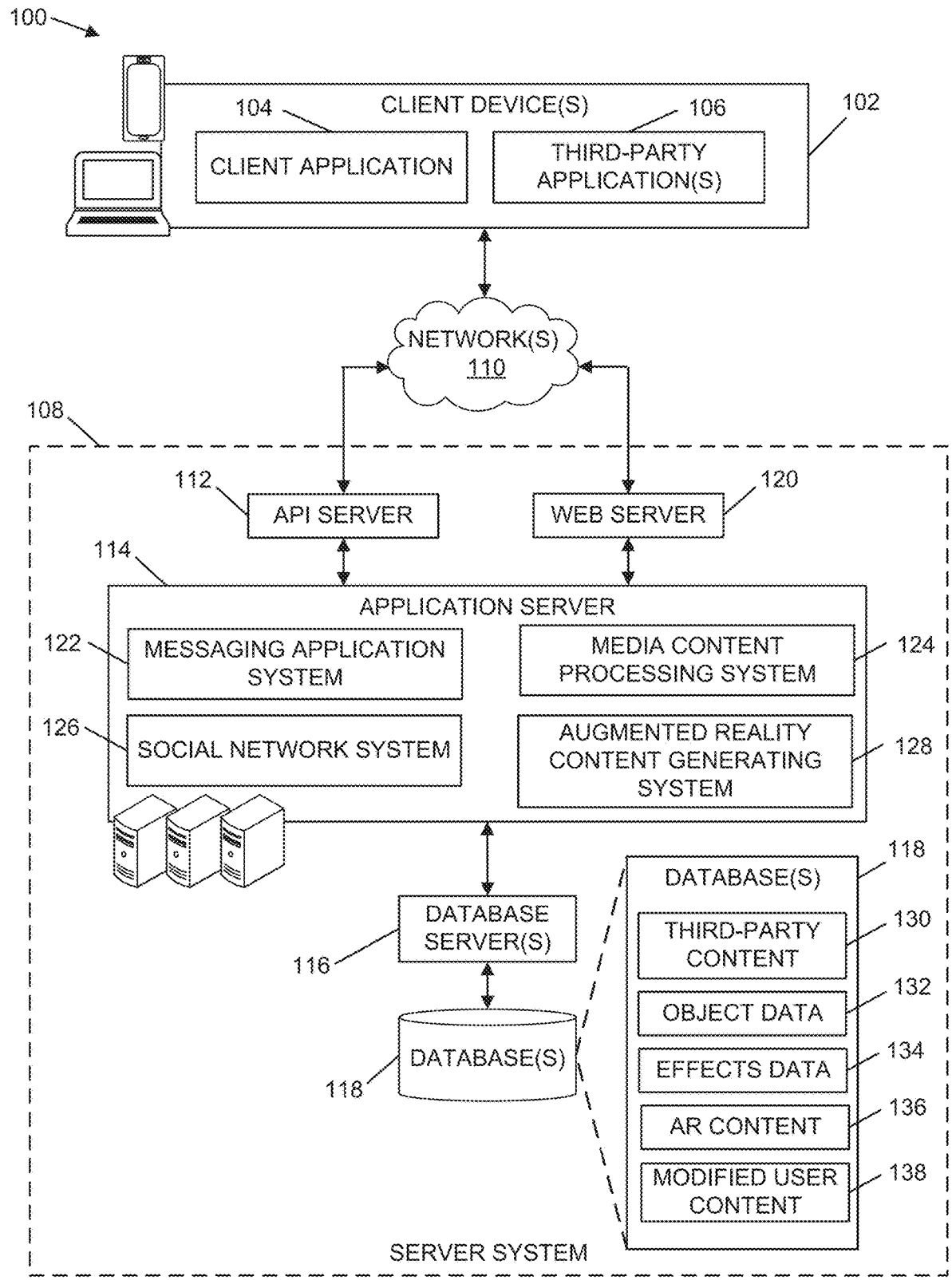
FIG. 1 is a diagrammatic representation of an architecture for exchanging data (e.g., messages and associated content) over a network, according to one or more example implementations.

Third parties may provide content to service providers that can be provided to users of technology platforms offered by the service providers. For example, a service provider may offer a social networking services via a social networking platform and third parties may provide content that is accessible to users of the social networking platform. Additionally, a service provider may offer messaging services via a messaging platform and third parties may provide content that is accessible to users of the messaging platform. In at least some examples, the third-party content may include advertisements. In various examples, the advertisements may be directed to products that may be purchased via the technology platform offered by the service provider.

In existing systems, users of a technology platform are typically unable to personalize third-party content. In scenarios related to advertisements, users may be unable to visualize how a product being advertised may look in relation to a given location or how a product may look on the user. Users may be more hesitant to purchase products in situations where the users are unable to visualize a personalized appearance of the product. In addition, users of a technology platform may want to re-create a look or scene shown in a third-party advertisement. However, existing systems are unable to modify third-party content in a way that is specific to a given user.

The systems, methods, techniques, instruction sequences, and computing machine program products described herein are directed to generating augmented reality content based on third-party content. In one or more examples, third-party content may be personalized with respect to a user of a client application. In various examples, augmented reality content may be generated based on the third-party content and then applied to at least one image of a user of the client application. To illustrate, the client application may generate a user interface that includes a first section that includes third-party content and a second section that includes content captured in a field of view of a camera of a client device executing the client application. Objects included in the third-party content may be matched with objects included in the field of view of the camera. Additionally, effects, such as visual effects or audio effects, that are related to the third-party content may be reproduced with respect to the content captured in the field of view of the camera. In one or more illustrative examples, augmented reality content that corresponds to the effects of the third-party content may be applied to content captured in the camera field of view. At least one of image content, video content, or audio content may be produced that includes the augmented reality content applied to at least a portion of the content captured in the camera field of view.

In one or more illustrative examples, third-party content may include one or more beauty products, such as lipstick, eyeshadow, various types of makeup, and the like. The third-party content may include at least one of image content, video content, or audio content related to the one or more beauty products. In these scenarios, the third-party content may be displayed in a first section of a user interface produced by a client application. In addition, content captured in the field of view of a camera of a client device executing the client application may be displayed in a second section of the user interface. In various examples, the content captured in the camera field of view may include or be related to one or more objects that are included in the third-party content. For example, in one or more scenarios where third-party content is directed to eye shadow, the content captured in the camera field of view may show an eye of the user of the client device. Augmented reality content may be generated that corresponds to the one or more beauty products. To illustrate, continuing with the example where the third-party content is related to eye shadow, augmented reality content may be generated that has a color and a pattern that correspond to the color and pattern of the eye shadow included in the third-party content. The augmented reality content may then be applied to the portion of the content captured in the field of view shown in the second section of the user interface. In one or more examples, the augmented reality content may be an overlay that is placed over a portion of content included in the field of view. For example, the augmented reality content may be an eye shadow color and pattern that is overlaid over a portion of a face of the user that is located around an eye of the user.

Additionally, at least one of image content or video content may be generated that includes the portion of the content captured in the camera field of view that includes an object related to the third-party content overlaid with the augmented reality content. Also continuing with the example from above, image content may be generated that includes an eye of a user and a portion of the face of the user around the eye with an overlay including a color and pattern of eye shadow that corresponds to the third-party content. In one or more implementations, the content corresponding to a modified version of the content captured in the field of view of the camera based on the third-party content may be shared by the user with one or more additional users of the client application. In one or more examples, the user may send a message to one or more additional users of the client application that includes the modified cameral field of view content based on the third-party content. Further, the user may share the modified camera field of view content based on the third-party content via a social networking platform of the client application.

Accordingly, the systems, methods, techniques, instruction sequences, and computing machine program products described herein provide various implementations to enhance image content or video content captured by a camera of a client device with augmented reality content that is based on third-party content. In this way, the third-party content may be customized with respect to a user of the client application by modifying image content or video content that includes at least a portion of a user or the environment of the user to correspond to effects included in the third-party content. In this way, users of the client application are more likely to adopt, consume, or purchase one or more objects included in the third-party content than existing systems that do not enable the customization of third-party content using augmented reality content.

FIG. 1 is a diagrammatic representation of an architecture 100 for exchanging data (e.g., messages and associated content) over a network. The architecture 100 may include multiple client devices 102. The client devices 102 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each client device 102 may host a number of applications, including a client application 104 and one or more third-party applications 106. A user may use the client application 104 to create content, such as video, images (e.g., photographs), audio, and media overlays. In one or more illustrative examples, the client application 104 may include a social networking functionality that enables users to create and exchange content. In various examples, the client application 104 may include messaging functionality that may be used to send messages between instances of the client application 104 executed by various client devices 102. The messages created using the client application 104 may include video, one or more images, audio, media overlays, text, content produced using one or more creative tools, annotations, and the like. In one or more implementations, the client application 104 may be used to view and generate interactive messages, view locations of other users of the client application 104 on a map, chat with other users of the client application 104, and so forth.

One or more users may be a person, a machine, or other means of interacting with a client device, such as the client device 102. In example implementations, the user may not be part of the architecture 100 but may interact with one or more components of the architecture 100 via a client device 102 or other means. In various examples, users may provide input (e.g., touch screen input or alphanumeric input) to a client device 102 and the input may be communicated to other entities in the architecture 100. In this instance, the other entities in the architecture 100, responsive to the user input, may communicate information to a client device 102 to be presented to the users. In this way, users may interact with the various entities in the architecture 100 using the client device 102.

Each instance of the client application 104 is able to communicate and exchange data with at least one of another instance of the client application 104, one or more third-party applications 106, or a server system 108. The data exchanged between instances of the client applications 104, between the third-party applications 106, and between instances of the client application 104 and the server system 108 includes functions (e.g., commands to invoke functions) and payload data (e.g., text, audio, image, video, or other multimedia data). Data exchanged between instances of the client applications 104, between the third-party applications 106, and between at least one instance of the client application 104 and at least one third-party application 106 may be exchanged directly from an instance of an application executed by a client device 102 and an instance of an application executed by an additional client device 102. Further, data exchanged between the client applications 104, between the third-party applications 106, and between at least one client application 104 and at least one third-party application 106 may be communicated indirectly (e.g., via one or more intermediate servers) from an instance of an application executed by a client device 102 to another instance of an application executed by an additional client device 102. In one or more illustrative examples, the one or more intermediate servers used in indirect communications between applications may be included in the server system 108.

The third-party application(s) 106 may be separate and distinct from the client application 104. The third-party application(s) 106 may be downloaded and installed by the client device 102 separately from the client application 104. In various implementations, the third-party application(s) 106 may be downloaded and installed by the client device 102 before or after the client application 104 is downloaded and installed. The third-party application(s) 106 may be an application that is provided by an entity or organization that is different from the entity or organization that provides the client application 104. The third-party application(s) 106 may be accessed by the client device 102 using separate login credentials than the client application 104. Namely, the third-party application(s) 106 may maintain a first user account and the client application 104 may maintain a second user account. In one or more implementations, the third-party application(s) 106 may be accessed by the client device 102 to perform various activities and interactions, such as listening to music, videos, track exercises, view graphical elements (e.g., stickers), communicate with other users, and so forth. As an example, the third-party application(s) 106 may include a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The server system 108 provides server-side functionality via one or more networks 110 to the client application 104. The server system 108 may be a cloud computing environment, according to some example implementations. For example, the server system 108, and one or more servers associated with the server system 108, may be associated with a cloud-based application, in one illustrative example. In one or more implementations, the client device 102 and the server system 108 may be coupled via the one or more networks 110.

The server system 108 supports various services and operations that are provided to the client application 104. Such operations include transmitting data to, receiving data from, and processing data generated by the client application 104. This data may include message content, media content, client device information, geolocation information, media annotation and overlays, message content persistence conditions, social network information, and live event information, as examples. Data exchanges within the architecture 100 are invoked and controlled through functions available via user interfaces (UIs) of the client application 104.

While certain functions of the architecture 100 are described herein as being performed by either a client application 104 or by the server system 108, the location of functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 includes an Application Programming Interface (API) server 112 that is coupled to, and provides a programmatic interface to, an application server 114. The application server 114 is communicatively coupled to a database server 116 that facilitates access to one or more databases 118. The one or more databases 118 may store data associated with information processed by the application server 114. The one or more databases 118 may be storage devices that store information such as untreated media content, original media content from users (e.g., high-quality media content), processed media content (e.g., media content that is formatted for sharing with client devices 102 and viewing on client devices 102), context data related to a media content item, context data related to a user device (e.g., a computing or client device 102), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 118 may further store information related to third-party servers, client devices 102, client applications 104, users, third-party applications 106, and so forth.

The API server 112 receives and transmits data (e.g., commands and message payloads) between client devices 102 and the application server 114. Specifically, the Application Program Interface (API) server 112 provides a set of interfaces (e.g., routines and protocols) that can be called or queried by the client application 104 in order to invoke functionality of the application server 114. The Application Program Interface (API) server 112 exposes various functions supported by the application server 114, including account registration, login functionality, the sending of messages, via the application server 114, from one instance of the client application 104 to another instance of the client application 104, the sending of media files (e.g., images, audio, video) from a client application 104 to the application server 114, and for possible access by another client application 104, the setting of a collection of media content (e.g., a gallery, story, message collection, or media collection), the retrieval of a list of friends of a user of a client device 102, the retrieval of such collections, the retrieval of messages and content, the adding and deletion of friends to a social graph, the location of friends within a social graph, and opening an application event (e.g., relating to the client application 104).

The server system 108 may also include a web server 120. The web server 120 is coupled to the application servers 114, and provides web-based interfaces to the application servers 114. To this end, the web server 120 processes incoming network requests over the Hypertext Transfer Protocol (HTTP) and several other related protocols.

The application server 114 hosts a number of applications and subsystems, including a messaging application system 122, a media content processing system 124, a social network system 126, and an augmented reality content generating system 128. The messaging application system 122 implements a number of message processing technologies and functions, particularly related to the aggregation and other processing of content (e.g., textual and multimedia content) included in messages received from multiple instances of the client application 104. For example, the messaging application system 122 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth). The messaging application system 122 may aggregate text and media content from multiple sources into collections of content. These collections are then made available, by the messaging application system 122, to the client application 104. Other processor- and memory-intensive processing of data may also be performed server-side by the messaging application system 122, in view of the hardware requirements for such processing.

The media content processing system 124 is dedicated to performing various media content processing operations, typically with respect to images, audio, or video received within the payload of a message or other content item at the messaging application system 122. The media content processing system 124 may access one or more data storages (e.g., the database(s) 118) to retrieve stored data to use in processing media content and to store results of processed media content.

The social network system 126 supports various social networking functions and services, and makes these functions and services available to the messaging application system 122. To this end, the social network system 126 maintains and accesses an entity graph within the database(s) 118. Examples of functions and services supported by the social network system 126 include the identification of other users of the client application 104 with which a particular user has relationships or is "following", and also the identification of other entities and interests of a particular user. The social network system 126 may access location information associated with each of the user's friends or other social network connections to determine where they live or are currently located geographically. In addition, the social network system 126 may maintain a location profile for each of the user's friends indicating the geographical location where the user's friends live.

The augmented reality content generating system 128 may generate augmented reality content based on content received from a third-party. In one or more examples, the third-party may include a provider of goods or services. The various examples, the third-party may make goods or services available for purchase via the client application 104. The content received from the third-party may be stored in the database(s) 118 as third-party content 130. The third-party content 130 may include information about one or more products offered for purchase via the client application 104. For example, the third-party content 130 may include a description of one or more products, pricing information related to one or more products, a seller of one or more products, a manufacturer of one or more products, reviews of one or more products, ratings of one or more products, image content related to one or more products, video content related to one or more products, audio content related to one or more products, or one or more combinations thereof. In one or more illustrative examples, the third-party content 130 may include an advertisement corresponding to a product offered for purchase via the client application 104.

The augmented reality content generating system 128 may determine one or more objects related to the third-party content 130. In one or more examples, the third-party providing the third-party content 130 may provide metadata indicating one or more objects and respective locations of the one or more objects included in at least one of image content or video content included in the third-party content 130. In one or more additional examples, the augmented reality content generating system 128 may analyze the third-party content 130 to determine one or more objects included in the third-party content 130. For example, the augmented reality content generating system 128 may implement one or more object recognition techniques to identify one or more objects included in the third-party content 130. These can include, for example, appearance-based processes that search for features such as edges, changes in lighting or color, or changes in shape or size. Various other techniques utilize gradient generation and matching or histogram analysis for object recognition. Other techniques include feature-based techniques, such as may utilize interpretation trees, geometric hashing, or invariance analysis. Moreover, techniques such as scale-invariant feature transform (SIFT) or speeded up robust features (SURF) techniques can also be used within the scope of the subject technology. In one or more illustrative examples, the augmented reality content generating system 128 may detect facial features of individuals included in the third-party content 130. In these situations, the augmented reality content generating system 128 may implement a template matching technique, a neural network technique (e.g., using a deep neural network, or a convolutional neural network), and the like), a Fisher linear discriminant technique, a maximal rejection classifier technique, a support vector machine technique, an edge filtering technique, an edge detection technique, and the like.

The augmented reality content generating system 128 may store data corresponding to objects included in the third-party content 130 as objects data 132. The objects data 132 may include one or more identifiers of one or more objects. For example, the augmented reality content generating system 128 may classify objects included in the third-party content 130. In various examples, an object included in the third-party content 130 may be classified according to a category related to the object. An object included in the third-party content 130 may also be classified based on an amount of similarity in relation to an object included in a library of objects stored by the database(s) 118. In one or more examples, the library of objects stored by the database(s) 118 may indicate characteristics of objects and identifiers of objects. In situations where the third-party content 130 includes facial features, the objects data 132 may indicate one or more facial features included in the third-party content 130, such as an eye, a nose, a mouth, lips, an ear, an eyebrow, eyelashes, combinations thereof, and the like. The objects data 132 may also include location data indicating locations of one or more objects included in at least one of images or videos included in the third-party content 130. The location data may indicate locations of pixels related to an object included in an image or video of the third-party content 130.

The augmented reality content generating system 128 may also determine one or more effects that correspond to third-party content 130. The one or more effects may include visual features included in at least one of one or more images or one or more videos included in the third-party content 130. In addition, the one or more effects may include audio features included in audio content included in the third-party content 130. The augmented reality content generating system 128 may store the effects included in the third-party content 130 as effects data 134. The effects may indicate at least one of colors, shapes, shading, sizing, or textures related to objects included in the third-party content 130. In one or more illustrative examples, the third-party content 130 may include an advertisement related to beauty products. In these scenarios, the effects may indicate changes to one or more facial features of an individual based on the application of at least one beauty product to the one or more facial features of the individual. In various examples, the third-party content 130 may include metadata indicating effects corresponding to one or more objects included in the third-party content 130. In one or more additional examples, the augmented reality content generating system 128 may analyze the third-party content 130 to determine one or more effects corresponding to the third-party content 130. For example, the augmented reality content generating system 128 may determine effects corresponding to one or more objects included in the third-party content 130 using one or more of appearance-based processes that search for features such as edges, changes in lighting or color, or changes in shape or size. Various other techniques may be implemented that utilize gradient generation and matching or histogram analysis for identifying effects corresponding to one or more objects included in the third-party content 130. The effects data 134 may indicate locations of pixels corresponding to one or more effects included in the third-party content 130. The effects data 134 may also indicate at least one of coloring, shading, size, or texture corresponding to one or more effects included in the third-party content 130.

In one or more implementations, the augmented reality content generating system 128 may generate augmented reality (AR) content 136. The AR content 136 may correspond to one or more objects included in the third-party content 130 and one or more effects included in the third-party content 130, where the one or more effects are related to the one or more objects. In various examples, the AR content 136 may indicate transformations of at least one of image content or video content of users of the client application 104 in relation to one or more objects and one or more effects included in the third-party content 130. For example, the AR content 136 may include transformations that change at least one of a color, shape, size, shading, or texture related to an object included in at least one of image content or video content of users of the client application 104. In one or more illustrative examples, the AR content 136 may include one or more overlays that modify at least one of image content or video content of users of the client application 104.

In one or more examples, the AR content 136 may cause one or more effects to be applied to one or more objects included in at least one of image content or video content of users of the client application 104. In various examples, the third-party content 130 may be related to a beauty product that is applied to a face of an individual. In these scenarios, the AR content 136 may modify an image of a face of a user of the client application 104. To illustrate, the AR content 136 may modify at least one of image content or video content captured in a field of view of a camera of a client device 102. In one or more illustrative examples, the third-party content 130 may include an advertisement for a beauty product that alters an appearance of a face of an individual. Continuing with this example, the AR content 136 may modify at least one of image content or video content to recreate the appearance of the face of the individual included in the third-party content with respect to a face of a user of the client application 104 captured in a field of view of a camera of the client device 102.

Additionally, the database(s) 118 may also store modified user content 138. The modified user content 138 may include content of users of the client application 104 that has been modified according to the AR content 136. For example, a user of the client application 104 may access the third-party content 130. In addition, the user may provide an indication to customize the third-party content 130, such that the user may obtain content that is related to the third-party content 130 and that is within a context that is familiar to the user. The customization of content with respect to the user may include applying the AR content 136 to at least one of image content or video content captured by at least one camera of the client device 102. In one or more illustrative examples, the third-party content 130 may include clothing and the AR content 136 may modify camera field of view content obtained via the client device 102 of the user, such that is appears that the user is wearing the clothing. Further, the user may cause the client application 104 to generate at least one of image content or video content that shows the user wearing the clothing. In this scenario, the modified user content 138 may include an image of the user wearing the clothing included in the third-party content 130.

In an additional illustrative example, the third-party content 130 may include a piece of furniture and field of view of a camera of the client device 102 of a user of the client application 104 may capture an environment of the user. Continuing with this example, the AR content 136 may place the piece of furniture in a location within the environment shown in the field of view of the camera of the client device 102. Further, modified user content 138 may be generated that includes at least one of image content or video content captured by at least one camera of the client device 102 that is modified with the piece of furniture shown in the environment of the user of the client application 104.

The modified user content 138 may be shared by a user of the client application 104. For example, a user of the client application 104 may use messaging functionality of the client application 104 to share the modified user content 138 with one or more additional users of the client application 104. To illustrate, a user of the client application 104 may generate a message using the client application 104 that includes the modified user content 138 and send data corresponding to the message to the server system 108 with additional data that indicates one or more recipients of the message. The messaging application system 122 may then send the message including the modified user content 138 to one or more client devices 102 of the one or more recipients. The one or more recipients may then access the message using the client application 104. Additionally, a user of the client application 104 may share the modified user content 138 using social networking functionality of the client application 104. In one or more illustrative examples, a user of the client application 104 may generate social networking content, such as a post or message, that is accessible to one or more additional users of the client application 104 via the social networking functionality of the client application 104. In various examples, the social network system 126 may make social networking content that includes the modified user content 138 accessible to one or more contacts of the user of the client application 104 that generated the social networking content including the modified user content 138.

Figure 2:
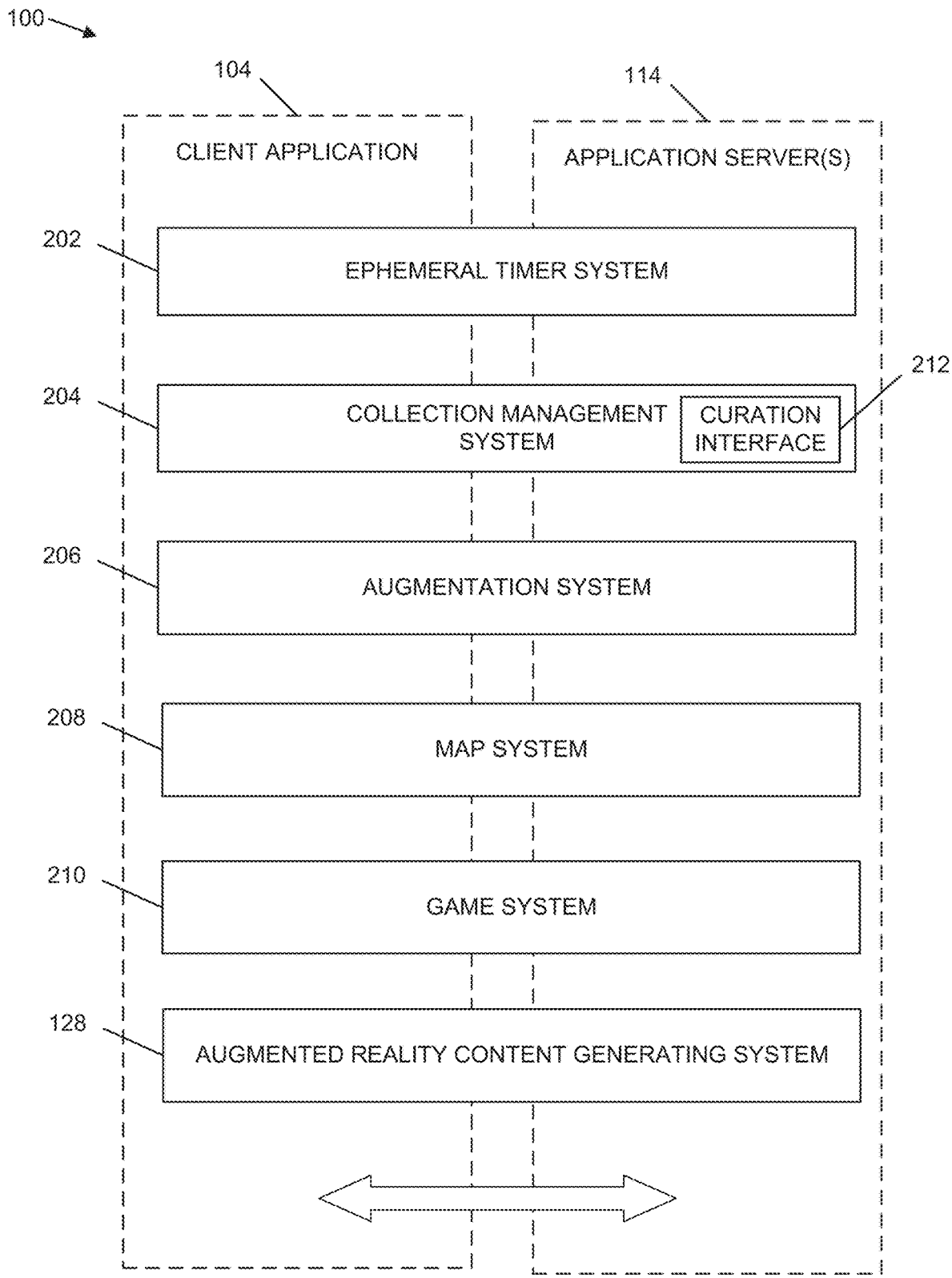
FIG. 2 is a diagrammatic representation of a system, in accordance with some examples, that may have both client-side and server-side functionality.

FIG. 2 is a block diagram illustrating further details regarding the server system 108, according to some examples. Specifically, the server system 108 is shown to comprise the client application 104 and the application servers 114. The server system 108 embodies a number of subsystems, which are supported on the client-side by the client application 104 and on the sever-side by the application servers 114. These subsystems include, for example, an ephemeral timer system 202, a collection management system 204, an augmentation system 206, a map system 208, a game system 210, and the augmented reality content generating system 128.

The ephemeral timer system 202 is responsible for enforcing the temporary or time-limited access to content by the client application 104 and the messaging application system 122. The ephemeral timer system 202 incorporates a number of timers that, based on duration and display parameters associated with a message, or collection of messages (e.g., a story), selectively enable access (e.g., for presentation and display) to messages and associated content via the client application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with content produced via the client application 104, such as a message. For example, the augmentation system 206 provides functions related to the generation and publishing of media overlays for content processed by the server system 108. The augmentation system 206 operatively supplies a media overlay or augmentation (e.g., an image filter) to the client application 104 based on a geolocation of the client device 102. In another example, the augmentation system 206 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database(s) 118 and accessed through the database server(s) 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the client application 104. For example, the map system 208 enables the display of user icons or avatars (e.g., stored in profile data 308 of FIG. 3) on a map to indicate a current or past location of "friends" of a user, as well as media content (e.g., collections of messages including photographs and videos) generated by such friends, within the context of a map. For example, a message posted by a user to the server system 108 from a specific geographic location may be displayed within the context of a map at that particular location to "friends" of a specific user on a map interface of the client application 104. A user can furthermore share his or her location and status information (e.g., using an appropriate status avatar) with other users of the server system 108 via the client application 104, with this location and status information being similarly displayed within the context of a map interface of the client application 104 to selected users.

The game system 210 provides various gaming functions within the context of the client application 104. The client application 104 provides a game interface providing a list of available games that can be launched by a user within the context of the client application 104, and played with other users of the server system 108. The server system 108 further enables a particular user to invite other users to participate in the play of a specific game, by issuing invitations to such other users from the client application 104. The client application 104 also supports both the voice and text messaging (e.g., chats) within the context of gameplay, provides a leaderboard for the games, and also supports the provision of in-game rewards (e.g., coins and items).

The augmented reality content generating system 128 may generate augmented reality content that may be used by the augmentation system 206 to augment or modify content, such as media content, generated using the client application 104. In one or more implementations, the augmented reality content generating system 128 may generate augmented reality content that is based on content received from third parties. In one or more illustrative examples, the augmented reality content may be based on beauty product advertisements. In various examples, the augmented reality content generated by the augmented reality content generating system 128 may determine one or more objects and one or more effects related to the one or more objects based on the third-party content and generate augmented reality content that corresponds to the one or more objects and the one or more effects. The augmentation system 206 may implement the one or more effects with respect to the one or more objects in relation to media content captured by the client application 104, such as media content captured by at least one camera of a client device 102. In one or more examples, the augmentation system 206 may modify one or more objects within a field of view of at least one camera of the client device 102 using the one or more effects of augmented reality content generated by the augmented reality content generating system 128.

Figure 3:
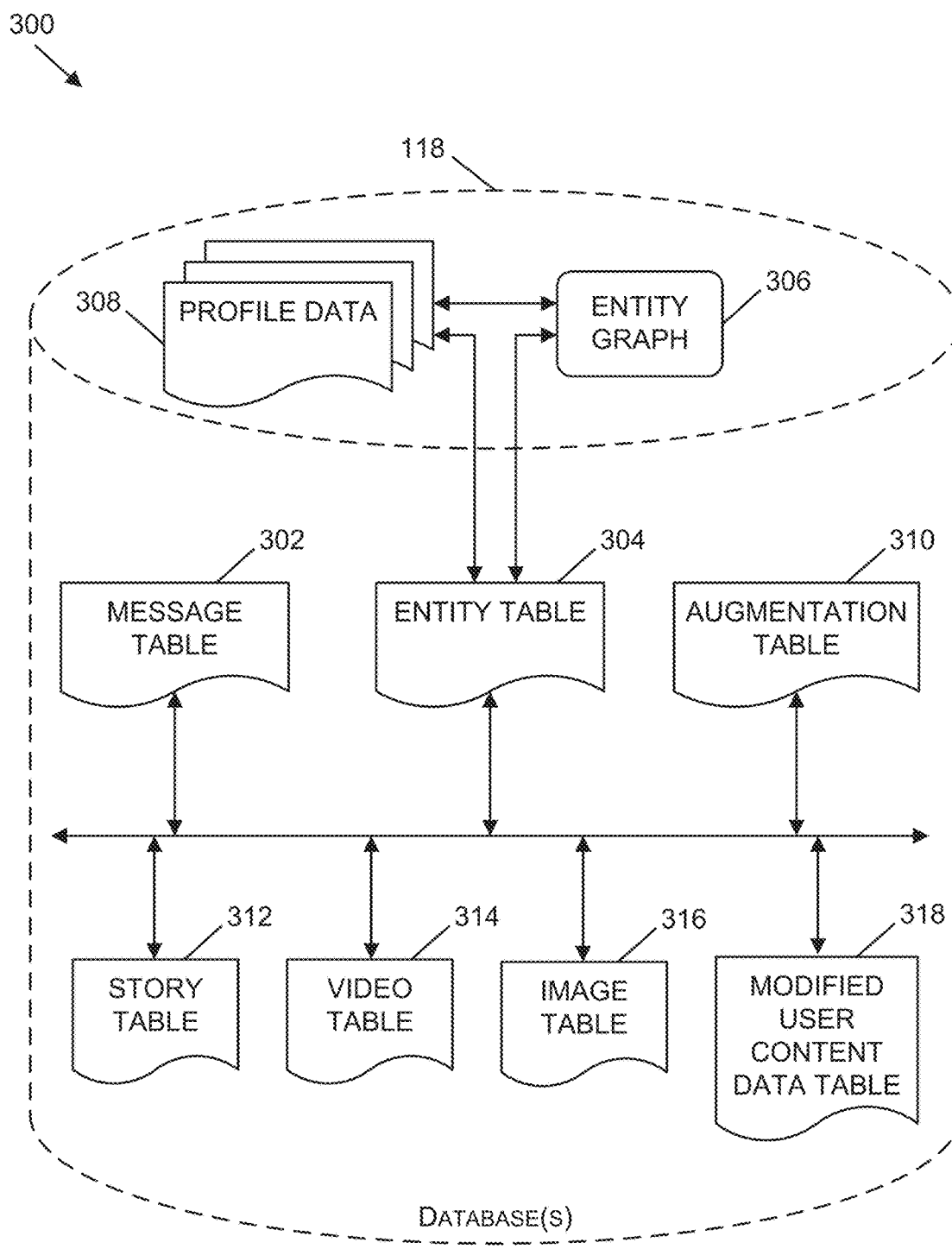
FIG. 3 is a schematic diagram illustrating data that may be stored in a database of a server system, according to one or more example implementations.

FIG. 3 is a schematic diagram illustrating data structures 300 which may be stored in the database(s) 118 of the server system 108, according to one or more example implementations. While the content of the database(s) 118 is shown to comprise a number of tables, it will be appreciated that the data could be stored in other types of data structures (e.g., as an object-oriented database).

The database 118 includes message data stored within a message table 302. This message data includes, for any particular one message, at least message sender data, message recipient (or receiver) data, and a payload.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the architecture 100, based on privacy settings specified by a particular entity. Where the entity is an individual, the profile data 308 includes, for example, a username, telephone number, address, settings (e.g., notification and privacy settings), as well as a user-selected avatar representation (or collection of such avatar representations). A particular user may then selectively include one or more of these avatar representations within the content of messages or other data communicated via the architecture 100, and on map interfaces displayed by client application 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 118 also stores augmentation data, such as overlays or filters, in an augmentation table 310. The augmentation data is associated with and applied to videos (for which data is stored in a video table 314) and images (for which data is stored in an image table 316). In one or more examples, the augmentation data may be generated by the augmented reality content generating system 128.

Filters, in one example, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location. For example, geolocation filters specific to a neighborhood or special location may be presented within a user interface by the client application 104, based on geolocation information determined by a Global Positioning System (GPS) unit of the client device 102.

Another type of filter is a data filter, which may be selectively presented to a sending user by the client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various implementations, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various implementations, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some implementations, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In various examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In one or more systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

A computer animation model to transform image data can be used by a system where a user may capture an image or video stream of the user (e.g., a selfie) using a client device 102 having a neural network operating as part of a client application 104 operating on the client device 102. The transformation system operating within the client application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various implementations, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some implementations, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database(s) 118 may also store a modified user content data table 318 that may include the modified user content 138. In one or more implementations, the modified user content data table 318 may include information indicating one or more objects included in the modified user content 138. The modified user content data table 318 may also indicate one or more effects applied to the one or more objects. In various examples, the modified user content data table 318 may indicate one or more identifiers of AR content that is used to modify content captured by or otherwise obtained by a camera of a client device 102 via the client application 104. In one or more additional examples, the modified user content data table 318 may indicate third-party content associated with modified user content 138. In one or more illustrative examples, the modified user content data table 318 may include information indicating one or more products related to AR content that may be used to modify content captured using the client application 104.

Figure 4:
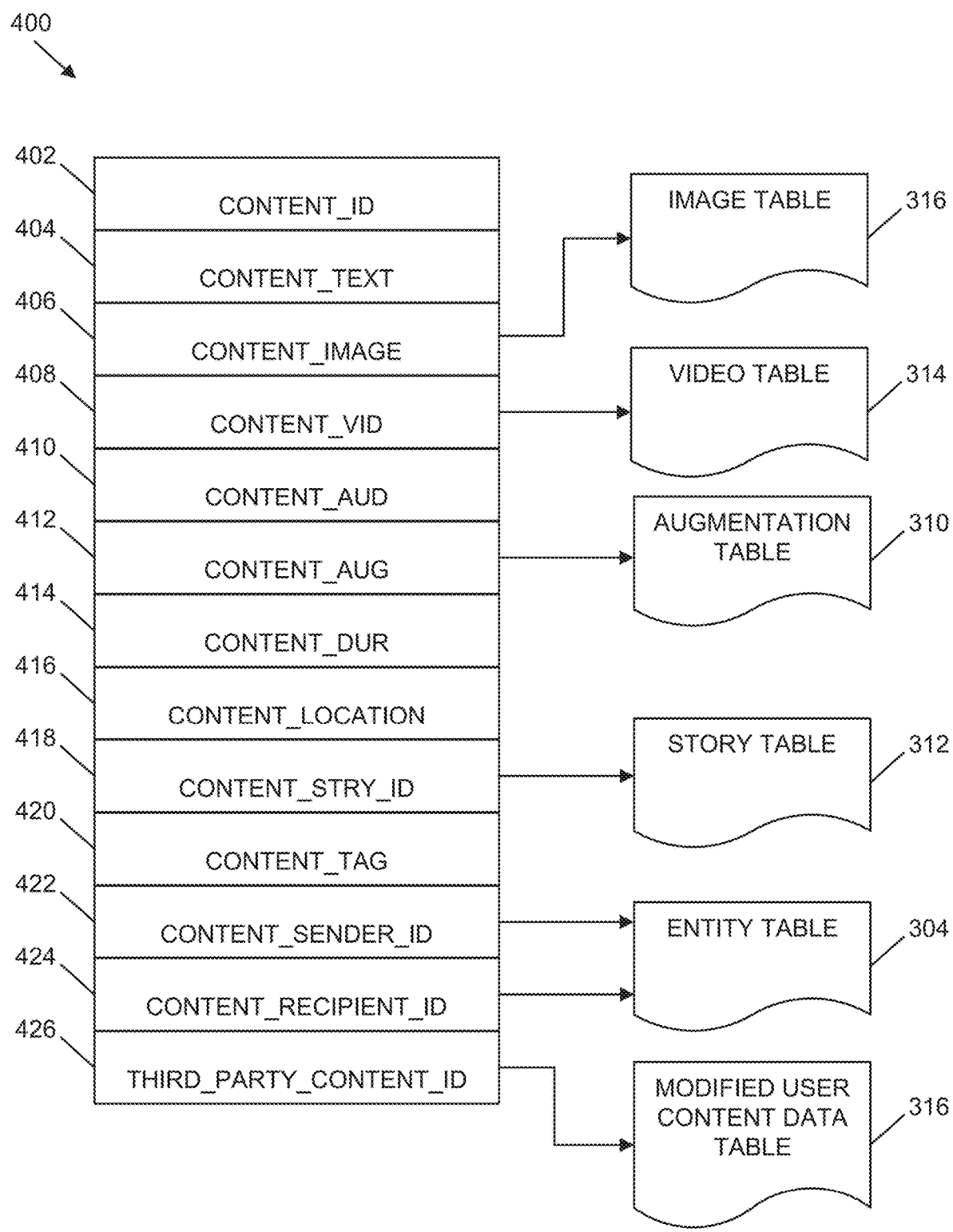
FIG. 4 is a schematic diagram illustrating an example framework for content that may be generated by a client application, in accordance with one or more example implementations.

FIG. 4 is a schematic diagram illustrating an example framework for content 400, according to some implementations. The content 400 may be generated by the client application 104. In various examples, the content 400 may be generated by a first instance of the client application 104 and communicated to at least one of a second instance of the client application 104 or the server system 108. In situations where the content 400 includes a message, the content 400 may be used to populate the message table 302 stored within the database(s) 118 and accessible by the application server 114. In one or more implementations, the content 400 may be stored in memory as "in-transit" or "in-flight" data of at least one of client devices 102 or the application server 114. The content 400 is shown to include at least a portion of the following components:

content identifier 402: a unique identifier that identifies the content 400.

content text payload 404: text, to be generated by a user via a user interface of the client device 102, and that is included in the content 400.

content image payload 406: image data, captured by a camera component of a client device 102 or retrieved from a memory component of a client device 102, and that is included in the content 400. Image data for a sent or received content 400 may be stored in the image table 316.

content video payload 408: video data, captured by a camera component or retrieved from a memory component of the client device 102, and that is included in the content 400. Video data for a sent or received content 400 may be stored in the video table 314.

content audio payload 410: audio data, captured by a microphone or retrieved from a memory component of the client device 102, and that is included in the content 400.

content augmentation data 412: augmentation data (e.g., filters, stickers, or other annotations or enhancements) that represents augmentations to be applied to content image payload 406, content video payload 408, or content audio payload 410 of the content 400. Augmentation data for a sent or received content 400 may be stored in the augmentation table 310.

content duration parameter 414: parameter value indicating, in seconds, the amount of time for which one or more portions of the content 400 (e.g., the content image payload 406, content video payload 408, content audio payload 410) are to be presented or made accessible to a user via the client application 104.

content geolocation parameter 416: geolocation data (e.g., latitudinal and longitudinal coordinates) associated with the content payload of the message. Multiple content geolocation parameter 416 values may be included in the payload, each of these parameter values being associated with respect to content items included in the content (e.g., a specific image into within the content image payload 406, or a specific video in the content video payload 408).

content story identifier 418: identifier values identifying one or more content collections (e.g., "stories" identified in the story table 312) with which a particular item in the content image payload 406 of the content 400 is associated. For example, multiple images within the content image payload 406 may each be associated with multiple content collections using identifier values.

content tag 420: each content 400 may be tagged with multiple tags, each of which is indicative of the subject matter of content included in the content payload. For example, where a particular image included in the content image payload 406 depicts an animal (e.g., a lion), a tag value may be included within the content tag 420 that is indicative of the relevant animal. Tag values may be generated manually, based on user input, or may be automatically generated using, for example, image recognition.

content sender identifier 422: an identifier (e.g., a messaging system identifier, email address, or device identifier) indicative of a user of the client device 102 on which the content 400 was generated and from which the content 400 was sent.

content receiver identifier 424: an identifier (e.g., a messaging system identifier, email address, or device identifier) indicative of a user of the client device 102 to which the content 400 is addressed.

A third-party content identifier 426: an identifier of third-party content used to produce at least a portion of the augmentations applied to at least one of image content, video content, or audio content of the content 400. In one or more illustrative examples, the third-party content identifier 426 may indicate an identifier of a product related to one or more augmentations applied to at least one of image content, video content, or audio content of the content 400.

The data (e.g., values) of the various components of content 400 may correspond to pointers to locations in tables within which the data is stored. For example, an image value in the content image payload 406 may be a pointer to (or address of) a location within an image table 316. Similarly, values within the content video payload 408 may point to data stored within a video table 314, values stored within the content augmentations 412 may point to data stored in an augmentation table 310, values stored within the content story identifier 418 may point to data stored in a story table 312, and values stored within the content sender identifier 422 and the content recipient identifier 424 may point to user records stored within an entity table 304. Further, values of the third-party content identifier 426 may point to data stored within a data structure that includes the modified user content data table 318.

Figure 5:
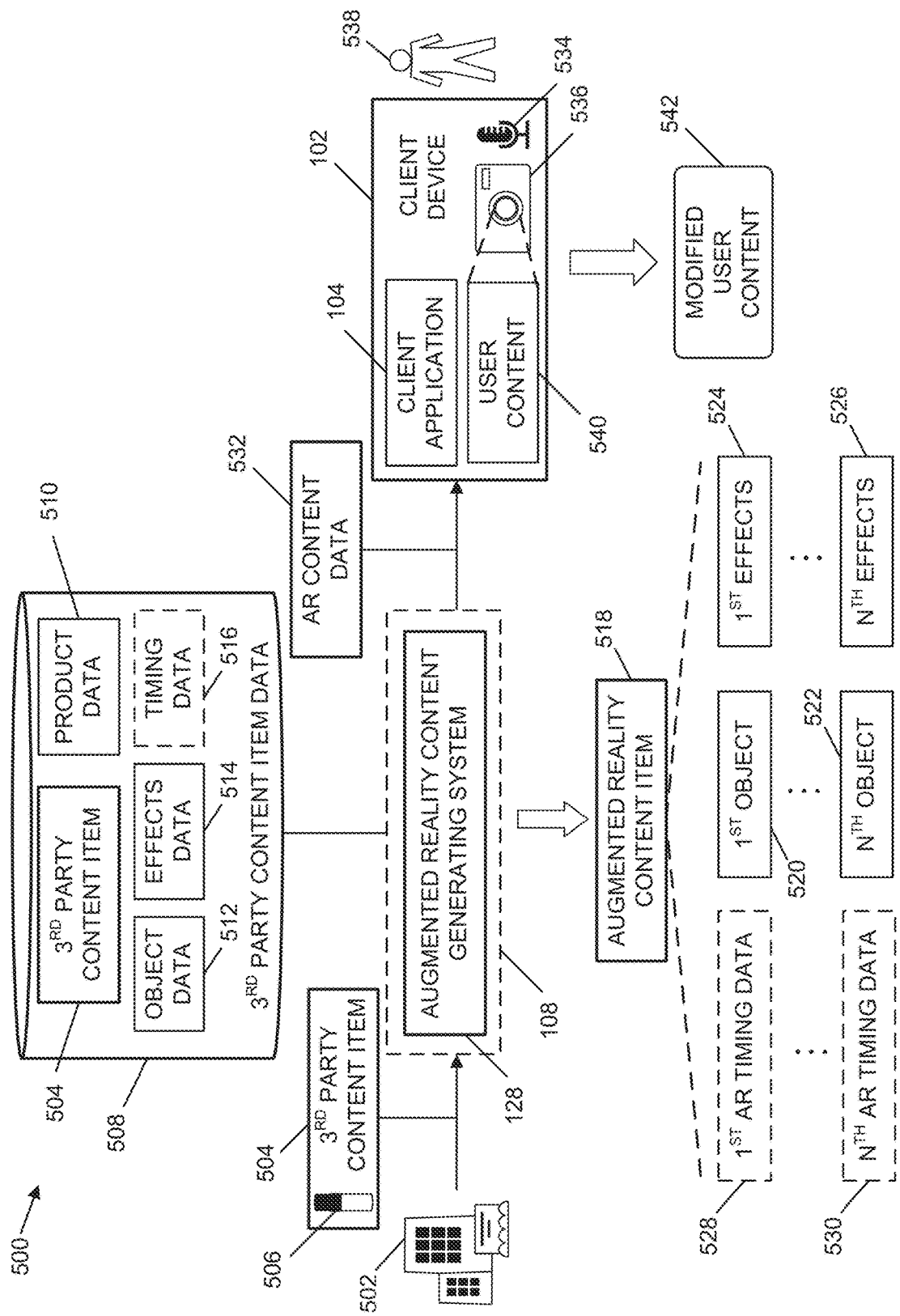
FIG. 5 is a diagrammatic representation illustrating an architecture to generate augmented reality content using third-party content, in accordance with one or more example implementations.

FIG. 5 is a diagrammatic representation illustrating an architecture 500 to generate augmented reality content using third-party content, in accordance with one or more example implementations. The architecture 500 may include a third-party 502. The third-party 502 may include at least one of a seller of one or more products or a manufacturer of one or more products. The third-party 502 may send a third-party content item 504 to the server system 108. The third-party content item 504 may include information about at least one product related to the third-party 502. For example, the third-party content item 504 may include information about a product 506. In one or more implementations, the product 506 may be offered for purchase via the client application 104. In various examples, the third-party content item 504 may include at least one of text content, video content, audio content, or image content related to the product 506. To illustrate, the third-party content item 504 may include one or more images of the product 506. In addition, the third-party content item 504 may include one or more videos of an individual using the product 506. In one or more illustrative examples, the third-party content item 504 may include an advertisement related to the product 506.

Based on the third-party content item 504, the augmented reality content generating system 128 may produce third-party content item data 508. The third-party content item data 508 may include the third-party content item 504. In one or more implementations, the third-party content item data 508 may include product data 510. The product data 510 may include at least one of a description of the product 506, an identifier of the product 506, pricing information related to the product 506, an identifier of the third-party 502, an identifier of the product 506, one or more ratings of the product 506, one or more reviews of the product 506, or an availability of the product 506.

In addition, the third-party content item data 508 may include information about features of the third-party content item 504. In one or more examples, the third-party content item data 508 may include object data 512. The object data 512 may include information about one or more objects included in the third-party content item 504. For example, the object data 512 may include locations of one or more objects included in the third-party content item 504. In one or more illustrative examples, the object data 512 may indicate pixels of at least one of video content or image content that are related to one or more objects included in the third-party content item 504. In addition, the object data 512 may include characteristics to one or more objects included in the third-party content item 504. To illustrate, the object data 512 may include at least one of colors, textures, sizing, shading, or shapes of one or more objects included in the third-party content item 504.

In various examples, the object data 512 may indicate one or more categories or classifications of one or more objects included in the third-party content item 504. For example, the object data 512 may also include information indicating one or more identifiers of one or more objects included in the third-party content item 504, such one or more common names related to an object or a type related to an object. In one or more illustrative examples, the product 506 may include a beauty product and the third-party content item 504 may include an image of the beauty product applied to a facial feature of an individual. In these situations, the object data 512 may indicate a portion of the image that corresponds to the facial feature of the individual, such as an eye, nose, cheek, lips, etc.

The third-party content item data 508 may also include effects data 514. The effects data 514 may indicate at least one of one or more visual effects or one or more audio affects related to the third-party content item 504. In various examples, the effects data 514 may indicate a visual effect corresponding to an object included in the third-party content item 504. To illustrate, the effects data 514 may indicate at least one of a color, a shape, sizing, shading, or texture that corresponds to an object or that corresponds to an area proximate to the object. The effects data may also indicate a location of one or more effects in the third-party content item 504. In one or more illustrative examples, the effects data 514 may indicate a portion of an individual where the product 506 may be applied to the individual. For example, in situations where the product 506 includes a beauty product, the effects data 514 may indicate changes to coloring of skin of an individual to which the product 506 is applied.

In implementations where the third-party content item 504 includes video content, the third-party content item data 508 may include timing data 516. The timing data 516 may indicate times at which one or more events take place during playback of the video content. The timing data 516 may include a time stamp or another indicator of the time at which an event occurring in the video takes place. In one or more illustrative examples, the timing data 516 may indicate times in a video where one or more objects are moving. Additionally, the timing data 516 may indicate the timing of changes made with respect to one or more objects in a video. For example, the timing data 516 may indicate one or more effects being applied to or more objects included in a video. In situations where the product 506 is a beauty product, the timing data 516 may indicate changes made to one or more facial features of an individual as the product 506 is applied to the one or more facial features.

In one or more implementations, the third-party content item 504 may include metadata that includes at least one of the product data 510, the object data 512, the effects data 514, or the timing data 516. In these scenarios, the augmented reality content generating system 128 may determine the product data 510, the object data 512, the effects data 514, the timing data 516, or one or more combinations thereof, based on the metadata associated with the third-party content item 504.

In one or more additional examples, the augmented reality content generating system 128 may determine at least a portion of one or more of the product data 510, the object data 512, the effects data 514, or the timing data 516 by analyzing the third-party content item 504. For example, the augmented reality content generating system 128 may implement one or more object detection techniques to identify one or more objects included in the third-party content item 504. In various examples, the augmented reality content generating system 128 may analyze data related to one or more objects included in the third-party content item 504 in relation to information accessible to the server system 108 that corresponds to a library of objects. The object information included in a library of objects accessible to the server system 108 may indicate characteristics of a number of different objects that may be included in third-party content item 504. For a given object, the library of object information may indicate at least one of a name of the object, a description of the object, a shape of the object, one or more colors of the object, shading information related to the object, or texture information related to the object.

To determine an object included in the third-party content item 504, the augmented reality content generating system 128 may determine a measure of similarity between information included in the library of object information and data obtained by the augmented reality content generating system 128 through an analysis of the third-party content item 504. In one or more examples, the augmented reality content generating system 128 may analyze information related to an object included in the third-party content item 504 with respect to information related to a number of objects included in the library of object information. For example, the augmented reality content generating system 128 may analyze one or more characteristics of an object included in the third-party content item 504 in relation to one or more characteristics of a number of objects included in the library of object information. In one or more illustrative examples, the augmented reality content generating system 128 may analyze at least one of a size of the object, a color of the object, a shape of the object, a size of the object, a texture of the object, or a shade of the object included in the third-party content item 504 in relation to objects included in the library of object information. Based on the analysis between one or more characteristics of the object included in the third-party content item 504 and the one or more characteristics of objects included in the library of object information, the augmented reality content generating system 128 may determine a measure of similarity between the object and one or more of the objects included in the library of object information. In situations where the measure of similarity is greater than a threshold measure of similarity, the augmented reality content generating system 128 may classify an object included in the third-party content item 504 in relation to a corresponding object included in the library of object information. The classification of the object included in the third-party content item 504 based on characteristics of objects included in a library of object information may be stored as at least a portion of the object data 512. Additionally, the one or more characteristics of the object determined by the augmented reality content generating system 128 may be stored as at least a portion of the object data 512.

In one or more implementations, the augmented reality content generating system 128 may determine one or more effects included in the third-party content item 504 by analyzing features of the third-party content item 504. For example, the augmented reality content generating system 128 may implement at least one of one or more color recognition techniques, one or more texture recognition techniques, one or more shading recognition techniques, or one or more edge detection techniques, to determine one or more effects related to one or more objects included in the third-party content item 504. The augmented reality content generating system 128 may also analyze the third-party content item 504 to determine respective locations of one or more effects included in the third-party content item 504. In various examples, the augmented reality content generating system 128 may determine pixels and characteristics of pixels (e.g., color, texture, shading) of one or more effects included in the third-party content item 504 and store the information related to the location and characteristics of the one or more effects as at least a portion of the effects data 514.

In various examples, the augmented reality content generating system 128 may analyze the third-party content item 504 to determine at least a portion of the timing data 516. In one or more examples, the augmented reality content generating system 128 may analyze the third-party content item 504 to determine one or more locations of one of more objects at various times during playback of video content or audio content related to the third-party content item 504. The augmented reality content generating system 128 may also analyze the third-party content item 504 to determine the timing of changes to at least one of one or more objects or one or more effects included in the third-party content item 504. In situations where the third-party content item 504 includes audio content, the augmented reality content generating system 128 may determine the timing of at least one of one or more words, one or more groups of words, or one or more sounds included in the third-party content item 504.

The augmented reality content generating system 128 may generate one or more augmented reality content items based on the third-party content item data 508. In the illustrative example of FIG. 5, the augmented reality content generating system 128 generate an augmented reality content item 518. The augmented reality content item 518 may modify at least one of image content, video content, or audio content captured via client devices 102. In various examples, the augmented reality content item 518 may modify an appearance related to one or more objects included in at least one of image content or video content captured by the client device 102. In one or more illustrative examples, the augmented reality content item 518 may modify an appearance of an object included in at least one of image content or video content captured by the client device 102 by modifying at least one of a color of the object, a shape of the object, a texture of the object, a size of the object, or shading of the object. In one or more additional examples, the augmented reality content item 518 may modify at least one of a color, a texture, a size, a shape, or shading of an area proximate to an object included in content captured by the client device 102. In further examples, the augmented reality content item 518 may modify audio content captured by the client device 102. To illustrate, the augmented reality content item 518 may modify at least one of one or more sounds or one or more words of audio content captured by the client device 102.

The augmented reality content item 518 may correspond to one or more objects included in the object data 512 and one or more effects included in the effects data 514. In situations where the third-party content item 504 includes at least one of video content or audio content, the augmented reality content item 518 may include AR timing data that corresponds to at least a portion of the timing data 516. In the illustrative example of FIG. 5, the augmented reality content item 518 may correspond to a first object 520 up to an Nth object 522 and include first effects 524 up to Nth effects 526. In situations where the augmented reality content item 518 is to be applied to at least one of video content or audio content, the augmented reality content item 518 may include first AR timing data 528 up to Nth AR timing data 530. In various examples, implementation of the augmented reality content item 518 may cause at least the first effects 524 to be applied to the first object 520 that is included in content captured by the client device 102. For example, implementing the augmented reality content item 518 may cause an appearance related to an object included in content captured by the client device 102 that corresponds to the first object 520 to be modified according to at least the first effects 524. In various examples, the modification of an object or an area proximate to an object included in content captured by the client device 102 that corresponds to the first object 520 may be modified based on the first effects 524 according to timing indicated by the first AR timing data 528. In one or more implementations, the first effects 524 may include multiple effects to be applied to the first object 520. In additional examples, the modification of an additional object or an area proximate to the additional object included in content captured by the client device 102 that corresponds to the Nth object 522 may be modified based on the Nth effects 526 according to timing indicated by the Nth AR timing data 530.

In one or more illustrative examples, the first AR timing data 528 up to the Nth AR timing data 530 may correspond to one or more times within the third-party content item 504 that one or more effects are produced. For example, the timing data 516 may include a sequential arrangement of timestamps that each correspond to one or more frames of the third-party content item 504. In these scenarios, the first AR timing data 528 up to the Nth AR timing data 530 may each correspond to one or more timestamps at which one or more effects 524, 526 are at least one of displayed, rendered, or produced. To illustrate, at least one of the client application 104 or the server system 108 may monitor timestamps related to content being at least one of displayed, rendered, or produced by the client device 102 and in response to determining that the timestamps of the content correspond to the timestamps of the first AR timing data 528, the first effects 524 may be produced. In additional examples, the first AR timing data 528 up to Nth AR timing data 530 may correspond to frames at which one or more events occur. In various examples, the first AR timing data 528 up to the Nth AR timing data 530 may correspond to frames at which one or more effects are produced. In these scenarios, at least one of the client application 104 or the server system 108 may monitor content of frames of at least one of video content or image content that is at least one of displayed or rendered by the client device 102. In response to determining that the content of frames of the at least one of video content or image content produced by the client device 102 corresponds to the content of frames corresponding to the first AR timing data 528, the first effects 524 may be produced.

The augmented reality content generating system 128 may send AR content data 532 to the client device 102. The AR content data 532 may include computer-readable instructions, such as software code, that may be executable to implement features of the augmented reality content item 518. For example, the AR content data 532 may include computer-readable instructions that are executable to make modifications to content captured via one or more input devices of the client device 102. To illustrate, the AR content data 532 may include computer-readable instructions that are executable to make modifications to content captured via at least one microphone 534 of the client device 102 and at least one camera 536 of the client device 102. In various examples, the AR content data 532 may include computer-readable instructions that are executable to modify content captured by the client device 102 and displayed via the client application 104. In one or more examples, the AR content data 532 may operate in conjunction with the client application 104 to modify content captured by one or more input devices of the client device 102.

In the illustrative example of FIG. 5, the client device 102 may be operated by a user 538. The user 538 may operate the one or more input devices of the client device 102 to capture content in association with the client application 104. For example, the user 538 may launch the client application 104. The client application 104 may generate one or more user interfaces. In various examples, the client application 104 may generate a user interface that includes at least a portion of the third-party content item 504 and that includes user content 540 that is captured by one or more input devices of the client device 102. To illustrate, the client application 104 may generate a user interface that includes at least a first section including at least a portion of the third-party content item 504 and a second section that includes content captured in a field of view of the camera 536. In one or more examples, the user content 540 may include real-time content captured by one or more input devices of the client device 102. In these situations, a user interface generated by the client application 104 may include at least one of real-time images, real-time audio, or real-time video being captured by one or more input devices of the client device 102. In additional examples, the user content 540 may include at least one of image content, video content, or audio content previously captured by one or more input devices of the client device 102.

In one or more implementations, the user 538 may select one or more user interface elements to cause the client application 104 to execute the AR content data 532 and modify the user content 540 captured by the camera 536 to create modified user content 542. For example, the client application 104 may execute the AR content data 532 to identify one or more objects included in the user content 540 that correspond to at least one object included in the augmented reality content item 518, such as at least one of the first object 520 or the Nth object 522. After identifying one or more objects included in the user content 540 that correspond to at least one object included in the augmented reality content item 518, the client application 104 may execute the AR content data 532 to apply at least a portion of the effects (e.g., first effects 524 to Nth effects 526) included in the augmented reality content item 518 to the at least one object. In one or more illustrative examples, the first object 520 may correspond to a facial feature and the first effects 524 may correspond to changing an appearance of the facial feature. In these scenarios, the client application 104 may execute the AR content data 532 to cause the appearance of the facial feature to be modified in the user content 540.

To illustrate, the user content 540 may be analyzed to determine one or more objects included in the user content that correspond to one or more objects included in the augmented reality content item 518. In one or more illustrative examples, one or more object recognition techniques may be implemented to identify one or more objects included in the user content 540. Information corresponding to the one or more objects included in the user content 540 may then be analyzed with respect to data corresponding to at least one object in the augmented reality content item 518. For example, an analysis may be performed with respect to characteristics of one or more objects included in the user content 540 in relation to characteristics of one or more objects included in the augmented reality content item 518. In one or more illustrative examples, the analysis may be performed by at least one of the augmented reality content generating system 128 or the client application 104. In various examples, the analysis may generate a measure of similarity between an object included in the user content 540 and an object included in the augmented reality content item 518. In situations where the measure of similarity satisfies at least a threshold measure of similarity, an object included in the user content 540 may be identified as an object that is also included in the augmented reality content item 518.

In response to identifying at least one object included in the user content 540 that corresponds to at least one object included in the augmented reality content item 518, at least one of the client application 104 or the server system 108 may execute the AR content data 532 to apply one or more effects to at least one of an object included in the user content 540 or an area proximate to an object included in the user content 540. In one or more examples, the client application 104 may cause for display, on a display screen of the client device 102, a user interface that includes the effects of the augmented reality content item 518 applied to one or more objects included in the user content 540. In various examples, the client application 104 may generate one or more user interfaces that include at least a first section that includes at least a portion of the third-party content item 504 and a second section that includes the modified user content 542 with the one or more effects of the augmented reality content item 518 applied to one or more objects included in the user content 540. In one or more illustrative examples, at least one of a color, a shape, a texture, a size, or shading related to an object included in the user content 540 may be modified to generate the modified user content 542.

In one or more illustrative implementations, the third-party content item 504 may include an advertisement for a product 506 that corresponds to a beauty product. In these scenarios, the third-party content item 504 may show the beauty product applied to or around at least one facial feature of an individual. Continuing with this example, the augmented reality content generating system 128 may generate the augmented reality content item 518 such that the first object 520 corresponds to a facial feature and the first effects correspond to changes to or around the facial feature produced by applying the beauty product to an individual. The camera 536 captures, in an example, at least a portion of the user 538 within the field of view of the camera 536 and the client application 104 may provide for display a user interface that includes a first section that shows the advertisement of the beauty product and a second section that includes the portion of the user 538 captured in the camera field of view. The client application 104 may then execute the AR content data 532 such that the facial feature of the user 538 that corresponds to the at least one facial feature of the augmented reality content item 518 is modified according to the one or more effects included in the augmented reality content item 518 such that a look of the individual included in the advertisement of the beauty product is reproduced with respect to the facial feature of the user 538 captured in the field of view of the camera 536. In various examples, the client application 104 may cause the second section of the user interface to include a magnified version of the field of view of the camera 536 that includes a magnification of the at least one facial feature related to the augmented reality content item 518 with the one or more effects of the augmented reality content item 518 applied to the at least one facial feature.

In one or more examples, the one or more effects of the augmented reality content item 518 may be applied to a real-time feed of content that includes the facial feature of the user 538 within the field of view of the camera 536. In one or more additional examples, the one or more effects of the augmented reality content item 518 may be applied to content that includes the facial feature of the user 538 that was previously captured by the camera 536, such as image content or video content stored by the client device 102 or stored in a remote storage location that is accessible by the client device 102. In various implementations, after applying the one or more effects of the augmented reality content item 518 to the facial feature of the user 538, the client application 104 may cause a version of the modified content to be stored as the modified user content 542 in memory of the client device 102, in a remote storage location, or both.

The user 538 may provide input to the client application 104 to share the modified user content 542 with one or more recipients. For example, the user 538 may cause the client application 104 to share the modified user content 542 via one or more messages generated using the client application 104. The user 538 may also cause the client application 104 to share the modified user content 542 via a social network that is accessible using the client application 104.

In various implementations, after a client device 102 of a recipient of the modified user content 542 receives the modified user content 542, the modified user content 542 may be accessible via an instance of the client application 104 executed by the client device 102 of the recipient. In one or more examples, the instance of the client application 104 executed by the client device 102 of the recipient may generate a user interface that includes the modified user content 542. The user interface may also include an option that is selectable to apply the augmented reality content item 518 to the recipient of the modified user content 542. In these situations, in response to selection of the option, an instance of the client application 104 executed by a client device 102 of the recipient may cause the one or more effects of the augmented reality content item 518 to be applied to user content captured by one or more input devices of the client device 102 of the recipient, such as at least one of image content, video content, or audio content related to the recipient. In this way, the augmented reality content item 518 may be shared by one or more users of the client application 104 and applied with respect to content of one or more recipients of modified user content 542 that has been shared via the client application 104.

In situations where the augmented reality content item 518 is applied to a facial feature of the user 538, the client application 104 may implement or invoke a scan of at least a portion of the face of the user 538 to identify at least one facial feature of the user 538 to which one or more effects of the augmented reality content item 518 may be applied. For example, the image data captured the camera 536 may be analyzed by a set of detection techniques to detect a facial feature (e.g., a right eye or a left eye of a user), where each detection technique of the set of detection techniques may detect the facial feature using a different technique. The different techniques may include using different sized windows to detect facial features, different starting positions of the windows, etc. Other techniques may be utilized, such as to use shape, template, or object recognition processes. In various examples, an object location technique may identify objects in the image data that satisfy one or more object detection criteria, such as objects (e.g., areas of a relatively common intensity in an image) of a specified size, shape, location, or combination thereof.

Further, in one or more examples, the image data captured by the camera 536 of the client device 102 may be analyzed to estimate the center of the head of the user 538 or location of another feature of the user 538. At least one example technique may utilize model-based techniques. One example of a model-based technique is active shape model (ASM). In this technique, a model of several facial feature locations and their relationship with image intensities around the feature points is learned. The model is learned, for example, using a training dataset including training images. During run-time, the model is applied to obtain the best fit of all the facial features to given image data. Another technique includes constrained local models (CLM) in which sets of points (constrained by a statistical shape model) are located on a given image data. In this technique, detection techniques are applied to detect different features on the face independently. In one or more examples, a different detection technique is trained for the right eye, left eye, mouth, etc. In an example, a single detection technique is utilized for each landmark and the detection techniques are applied to the image and a model is fitted to the detection technique responses to obtain the best fit of all facial features to the given face image.

Additionally, in accordance with one or more implementations, a facial feature may be detected using multiple tuned detection techniques. The facial feature may be, for example, the location of eyes, location of mouth, nose or any identifiable feature on the human face. Several detection techniques may be trained for a chosen feature. At run-time, at least a portion of the detection techniques may be applied. In various implementations, the detection techniques may be associated with a confidence value. The detection techniques may provide an estimate of the center of the head of the user 538 and the estimates may be combined according to their confidence value or otherwise combined to obtain a determined location of the center of the head.

After a facial region related to the augmented reality content item 518 is identified, one or more head or face detection techniques may be used to identify a sub-region of the face of the user 538. Example head or face detection techniques may include any appropriate technique known or used for such purposes, such as a template matching technique, a neural network technique (e.g., using a deep neural network, or a convolutional neural network), and the like), a Fisher linear discriminant technique, a maximal rejection classifier technique, a support vector machine technique, an edge filtering technique, an edge detection technique, one or more combinations thereof, and the like.

In one or more implementations, the aforementioned detection techniques may determine the facial features and facial characteristics using a number of different techniques. This can include, for example, identifying (e.g., recognizing) unique or distinguishing points such as feature points, facial marks, geometric shapes or distances, or other such features on the face. Example facial recognition techniques may include, for example, a linear discriminate analysis technique, a Hidden Markov model-based technique, a principal component analysis technique, a Fisher face technique, and a neuronal motivated dynamic link matching technique, and the like. In some implementations, specially trained Haar classifiers or other like classifiers may be used to detect the facial features. It should be appreciated that any number of techniques may be used. In various embodiments, the facial features may include at least one of an eye, mouth, nose, shape of a head, forehead, cheek, chin, jaw, eyebrow, eyelashes, or any other facial feature.

Figure 6:
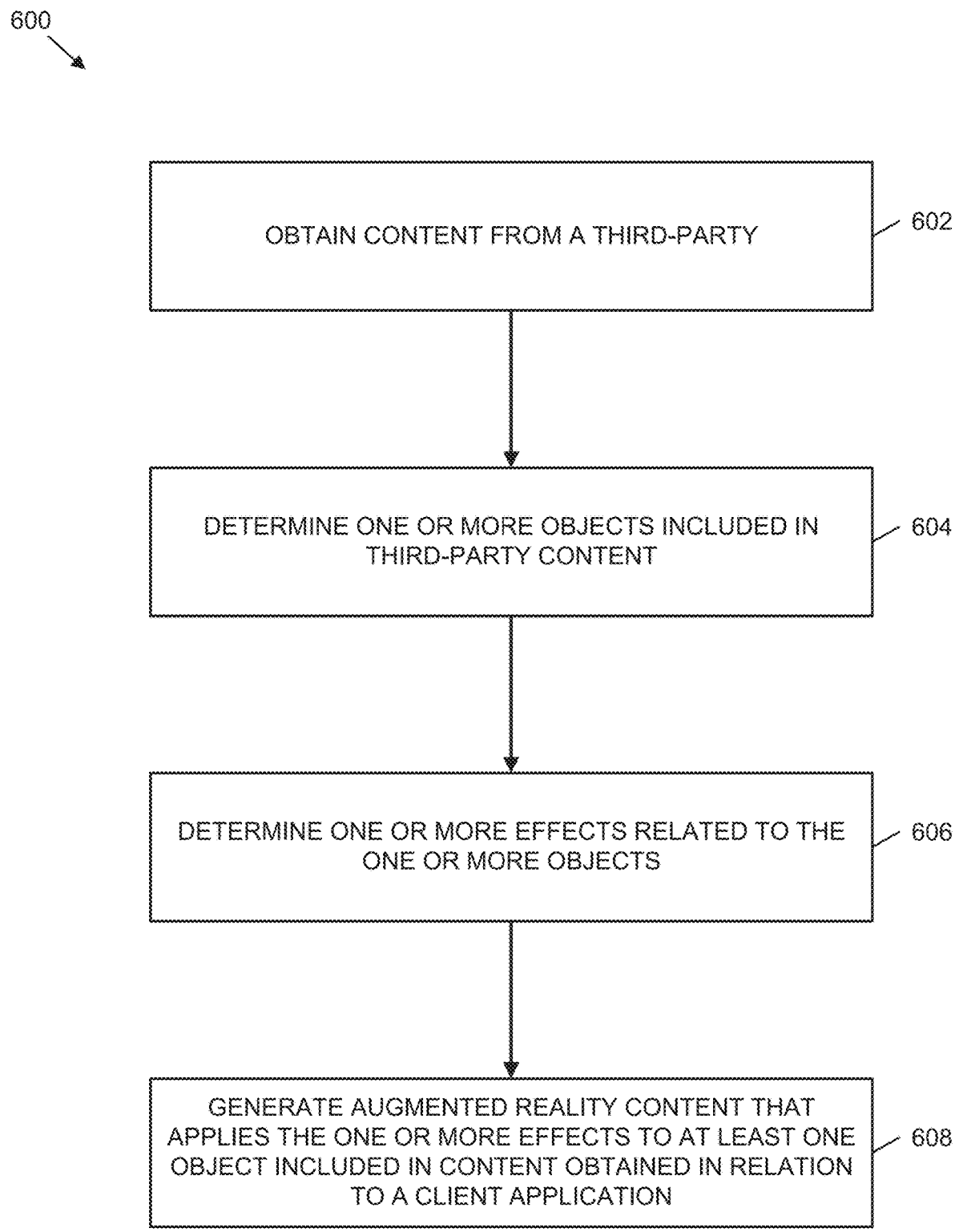
FIG. 6 is a flowchart illustrating example operations to generate augmented reality content using third-party content, according to one or more example implementations.
Figure 7:
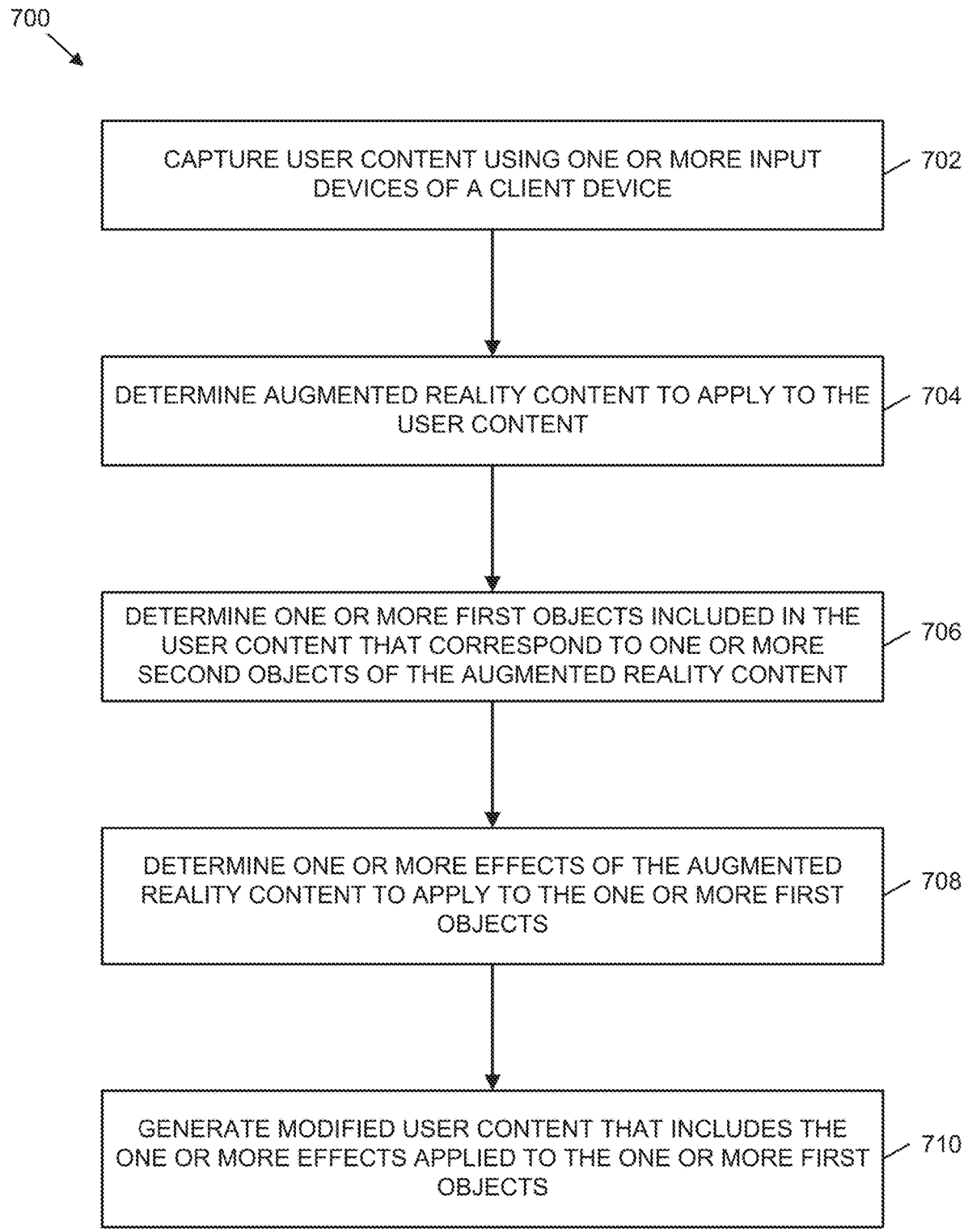
FIG. 7 is a flowchart illustrating example operations to prepare third-party content for use in generating augmented reality content, according to one or more example implementations.

FIGS. 6 and 7 illustrate flowcharts of processes to generate and apply augmented reality content items related to products offered for purchase via the client application 104. The processes may be embodied in computer-readable instructions for execution by one or more processors such that the operations of the processes may be performed in part or in whole by the functional components of at least one of the client application 104 or the server system 108. Accordingly, the processes described below are by way of example with reference thereto, in some situations. However, in other implementations, at least some of the operations of the processes described with respect to FIGS. 6 and 7 may be deployed on various other hardware configurations. The processes described with respect to FIGS. 6 and 7 are therefore not intended to be limited to the server system 108 or client device 102 and can be implemented in whole, or in part, by one or more additional components. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 6 is a flowchart illustrating example operations of a process 600 to generate augmented reality content using third-party content, according to one or more example implementations. At operation 602, the process 600 may include obtaining content from a third-party. The content may include at least one of audio content, video content, image content, or text content. In one or more examples, the content may be related to a product offered for acquisition via a client application. In addition to functionality that enables user s of the client application to purchase products, the client application may also include at least one of messaging functionality or social network functionality. In various examples, the third-party content may include an advertisement for a product. The third-party may include at least one of a seller of a product, a manufacturer of a product, a service provider for a seller of a product, or a service provider for a manufacturer of a product.

In addition, the process 600 may include, at operation 604, determining one or more objects included in the third-party content. The one or more objects may be determined by analyzing data related to the third-party content using one or more object recognition techniques. Examples of object recognition techniques implemented to determine one or more object included in the third-party content may include appearance-based processes that search for features such as edges, changes in lighting or color, or changes in shape or size. Various other techniques utilize gradient generation and matching or histogram analysis for object recognition. Other techniques include feature-based techniques, such as may utilize interpretation trees, geometric hashing, or invariance analysis. Moreover, techniques such as scale-invariant feature transform (SIFT) or speeded up robust features (SURF) techniques can also be used within the scope of the subject technology.

In further examples, one or more objects included in the third-party content may be determined based on metadata corresponding to the third-party content. For example, metadata corresponding to the third-party content may indicate at least one of identifiers of one or more objects included in the third-party content, respective locations of one or more objects included in the third-party content, or characteristics of one or more objects included in the third-party content. The characteristics of the one or more objects may include at least one of size, shape, color, shading, or texture. In one or more illustrative examples, the third-party content may include a face of an individual and may show one or more beauty products applied to the face of the individual. In these scenarios, metadata corresponding to the third-party content may indicate that the third-party content includes facial features, such as eyes, nose, forehead, lips, mouth, chin, cheeks, eyelashes, eyebrows, combinations thereof, and so forth. In one or more examples, metadata corresponding to the third-party content may be obtained from the third-party that provided the content. In various examples, the metadata corresponding to the third-party content may be obtained from a different third-party, such as a service provider related to the third-party that provided the content.

In one or more implementations, the one or more objects may be determined based on user input indicating at least a portion of the one or more objects included in the third-party content. To illustrate, a representative of a service provider that distributes the client application and implements the functionality provided via the client application may provide input indicating at least one of identifiers of objects included in the third-party content, respective locations of objects included in the third-party content, or characteristics of objects included in the third-party content. In additional examples, a user of the client application may provide input indicating information about one or more objects included in the third-party content. In one or more examples, data obtained via user input may be stored as metadata of the third-party content.

At operation 606, the process 600 may include determining one or more effects related to the one or more objects. The one or more effects may include visual features that are related to an object. The visual features may include motion of an object. The visual features may also include modifications to the appearance of an object. Additionally, the visual features may include modifications to an initial appearance of an area that is proximate to an object included in the third-party content. In one or more illustrative examples, in scenarios where the third-party content is related to a beauty product, the one or more effects may indicate changes to one or more portions of a face of an individual in response to the beauty product being applied to the face of the individual. To illustrate, the one or more effects may indicate color changes to an area around the eye of an individual in response to eye shadow being applied to the area around the eye of the individual. In another illustrative example, the one or more effects may indicate color changes to lips of an individual in response to lipstick being applied to the lips.

The one or more effects may be determined by implementing one or more computational techniques with respect to the third-party content, such as appearance-based processes that search for features such as edges, changes in lighting or color, or changes in shape or size. The one or more effects may also be determine using at least one of image feature extraction computational techniques or image feature classification computational techniques. One or more additional techniques may utilize gradient generation and matching or histogram analysis for object recognition. Still other techniques may include feature-based techniques that may utilize interpretation trees, geometric hashing, or invariance analysis. Moreover, techniques such as scale-invariant feature transform (SIFT) or speeded up robust features (SURF) techniques may also be used within the scope of the subject technology. Additionally, the one or more effects may be determined based on metadata of the third-party content indicating the one or more effects. The metadata may indicate respective locations of one or more effects, characteristics of the one or more effects, timing data of the one or more effects, locations of the one or more effects, or one or more combinations thereof. Further, the one or more effects may be determined based on input obtained from at least one of a representative of a service provider related to the third-party, a representative of a service provider related to the client application, or a user of the client application.

The process 600 may also include, at operation 608, generating augmented reality content that applies the one or more effects to at least one object included in the content obtained in relation to a client application. The augmented reality content may include computer-readable instructions that are executable to cause one or more effects to be applied to content, such as at least one of image content, video content, or audio content. In one or more examples, the augmented reality content may include an overlay or a filter that changes the appearance of one or more portions of content. In one or more examples, the augmented reality content may cause transformations to take place with respect to the appearance of one or more portions of content that is obtained in relation to the client application.

In one or more implementations, the content to which the one or more effects are applied may include content that is captured using one or more input devices of a client device. In various examples, the one or more effects may be applied to real-time content that is being captured by at least one camera of a client device. In additional examples, the content to which the one or more effects are applied may have been previously captured via one or more input devices of a client device.

In one or more illustrative examples, the augmented reality content may apply the one or more effects to content by modifying data related to pixels of the content. For example, the augmented reality content may indicate an object, a location, or a region proximate to the object and changes to be applied to pixels that correspond to the object, location, or region proximate to the object. In various examples, the changes made to pixels of the content in accordance with the one or more effects may take into consideration the characteristics of the pixels before the one or more effects are applied. To illustrate, in an example where the one or more effects correspond to eye shadow being applied to a region around an eye of a user of the client application, the original coloring of the skin around the eye of the individual may affect the modifications made to the region around the eye of the individual in response to the eye shadow being applied. That is, the application of eye shadow to the skin of individuals having different skin tones may provide different results.

FIG. 7 is a flowchart illustrating example operations of a process 700 to prepare third-party content for use in generating augmented reality content, according to one or more example implementations. The process 700 may include, at operation 702, capturing user content using one or more input devices of a client device. In one or more examples, the content may be captured by at least one camera of a client device that executes an instance of a client application that provides at least one of messaging functionality or social networking functionality. In various examples, the content may be displayed via a user interface generated by the client application. The content may be real-time content that is being captured via at least one camera of a client device of a user of the client application. In additional examples, the content may have been previously captured by at least one camera and is stored in memory of a client device or in a remote storage location that is accessible to the client application. The content may include at least one of video content, audio content, image content, or text content.

The process 700 may also include, at operation 704, determining augmented reality content to apply to the user content. The augmented reality content may be applied to the user content to make one or more modifications to the user content. In various examples, the augmented reality content applied to the user content may be based on third-party content that is accessed via the client application. In one or more examples, the augmented reality content may correspond to an advertisement related to one or more products offered for purchase via the client application. In one or more implementations, the client application may produce a user interface that includes a first section displaying third-party content and a second section that displays the user content obtained using one or more input devices of the client device. In these situations, the augmented reality content may correspond to the third-party content and cause one or more modifications to the user content displayed in the second section in accordance with one or more features of the third-party content displayed in the first section.

In addition, at operation 706, the process 700 may include determining one or more first objects included in the user content that correspond to one or more second objects of the augmented reality content. For example, the user content may be analyzed according to one or more object detection techniques to determine characteristics of the one or more first objects included in the user content. To illustrate, the content may be analyzed to determine one or more of size, shape, color, texture, shading, or location of the one or more first objects. The characteristics of the one or more first objects may then be analyzed in relation to characteristics of the one or more second objects. In various examples, the characteristics of the one or more second objects may be stored in a library of objects related to third-party content. The characteristics of the one or more second objects may also be included in metadata of the third-party content.

In one or more examples, a measure of similarity may be determined between a first object and a second object. In one or more illustrative examples, the measure of similarity may be determined by analyzing an identifier of the first object in relation to an identifier of the second object. In one or more additional examples, the measure of similarity may be determined by analyzing at least one of a size of the first object, coloring of the first object, a shape of the first object, a texture of the first object, or shading of the first object in relation to corresponding at least one of a size of the second object, coloring of the second object, a shape of the second object, a texture of the second object, or shading of the second object. The first object may correspond to the second object based on the measure of similarity between the first object and the second object being at least a threshold measure of similarity. In these situations, the first object and the second object may be identified as a same or similar object. In various examples, the threshold measure of similarity may correspond to a similarity metric that is determined based on an analysis of first characteristics of the first object with respect to second characteristics of the second object. The analysis may be related to determining an amount of similarity between at least one of size, shape, color, texture, edges, and so forth, of the first object and the second object. In various examples, the analysis may determine an amount of confidence that the first object is a same or similar object with respect to the second object. In one or more implementations, the threshold measure of similarity may correspond to a threshold confidence level that the first object is a same or similar object with respect to the second object, such as an 80% confidence level, a 90% confidence level, a 95% confidence level, a 98% confidence level, or a 99% confidence level.

At operation 708, the process 700 may include determining one or more effects of the augmented reality content to apply to the one or more first objects included in the user content. In various examples, the augmented reality content may indicate at least one effect that corresponds to a second object of the augmented reality content. For example, the augmented reality content may include metadata indicating one or more effects that correspond with each second object associated with the augmented reality content. The one or more effects may include visual effects that are related to at least one of an appearance of a second object or an appearance of a region proximate to the second object. The one or more effects may be applied to at least one first object that corresponds to a second object that is associated with the one or more effects by the augmented reality content item.

Further, the process 700 may include, at operation 710, generating modified user content that includes the one or more effects applied to the one or more first objects. For example, after determining that a first object of the user content corresponds to a second object of the augmented reality content, one or more effects related to the second object may be applied to the first object. In these situations, applying the one or more effects to the first object may change at least one of an appearance of the first object or an appearance of a region proximate to the first object to correspond to at least one of an appearance of the second object or a region proximate to the second object. In one or more implementations, applying the one or more effects to the one or more first objects may include modifying at least one of a color, a texture, or shading of pixels that correspond to the one or more first objects in the user content. In situations where the first object and the second object correspond to clothing, applying the one or more visual effects to the user content may include altering an appearance of the user such that the user is wearing an item of clothing of the augmented reality content item that is different from an item of clothing being worn by the user in the user content. In additional examples where a second object of the augmented reality content is jewelry, applying the one or more effects may include modifying a body part of the user, such as an ear or wrist, such that the user content shows the user wearing the jewelry. In additional scenarios, applying the one or more effects may correspond to modifying a color of a piece of furniture or changing the appearance of a room to correspond to a rendering of a proposal to remodel the room.

The modified user content may be shared with other users of the client application via at least one of messaging functionality or social networking functionality of the client application. In various examples, after receiving the modified user content, an additional user of the client application may also cause the augmented reality content that was applied to the user content of the initial user to subsequently be applied to additional user content of the additional user. For example, the additional user may select one or more user interface elements to cause the one or more effects of the augmented reality content to be applied to additional content that is captured by one or more input devices of an additional client device of the additional user. In situations where the augmented reality content is related to applying a beauty product to a face of an individual, a first user may share modified user content with a second user that shows the beauty product applied to the face of the first user. The second user may then select one or more user interface elements to cause the beauty product to also be applied to the face of the second user.

Figure 8:
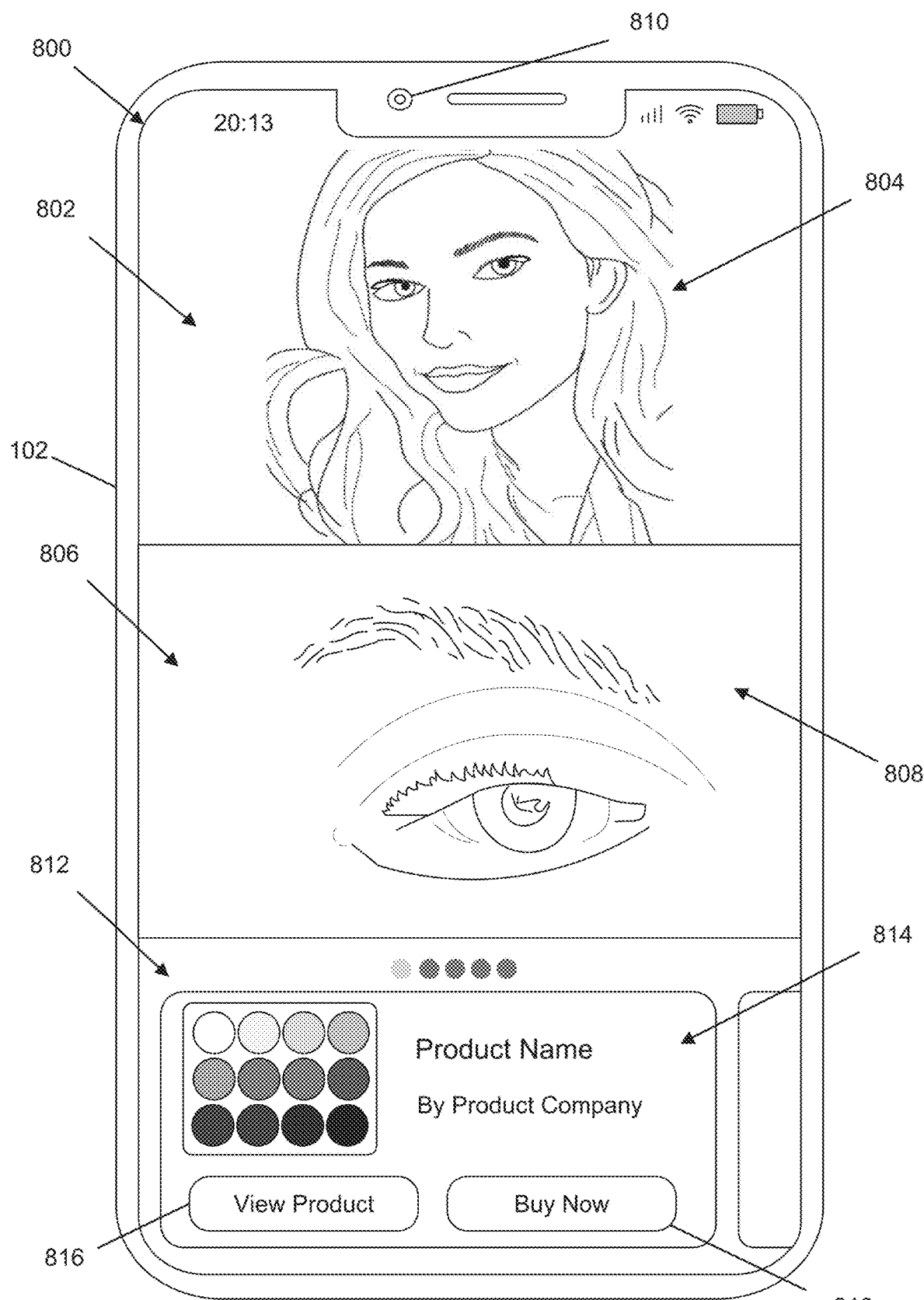
FIG. 8 is an illustration of a user interface that includes a first section including third-party content and a second section including a field of view of a camera that is modified according to the third-party content, according to one or more example implementations.

FIG. 8 is an illustration of a user interface 800 that includes a first section 802 including third-party content 804 and a second section 806 including user content 808 captured in a field of view of a camera 810 that is modified according to the third-party content 804, according to one or more example implementations. The user interface 800 may be displayed via a display device of the client device 102. In addition, the user interface 800 may be displayed by a client application, such as the client application 104, that includes at least one of messaging functionality or social networking functionality. In one or more examples, the user content 808 may display a magnified version of the content captured in the field of view of the camera 810. For example, the second section 806 may include a magnification of a facial feature of a user of the client device 102. In the illustrative example of FIG. 8, the second section 806 displays a magnification of an eye and the region proximate to the eye of the user of the client device 102.

The third-party content 804 may include an advertisement. In one or more examples, the third-party content 804 may include an advertisement for a beauty product. In these scenarios, the advertisement for the beauty product may show the beauty product applied to a portion of a face of an individual. In one or more implementations, the second section 806 may show one or more visual effects applied to the user content 808 that correspond to the application of the beauty product to a portion of the face of the user of the client device 102 that corresponds to the application of the beauty product to the portion of the face of the individual shown in the third-party content 804. In various examples, augmented reality content that corresponds to one or more visual effects shown in the first section 802 may be applied to the user content 808. In one or more illustrative examples, augmented reality content generated based on the third-party content 804 may be applied to the user content 808 to recreate one or more visual effects of the third-party content 804 with respect to the user content 808. In the illustrative example of FIG. 8, the user content 808 may be modified to show the application of the beauty product of the third-party content 804 to the eye of a user of the client device 102.

Additionally, the user interface 800 may include a third section 812 that includes product information 814 related to a product offered for purchase via the client application. The product information 814 may includes at least one of image content, video content, audio content, or text content related to a product that corresponds to the third-party content 804. In one or more examples, the product information 814 may include at least one of pricing information, seller information, manufacturer information, product description information, ratings information, or reviews information. In various examples, the third section 812 may also include a first user interface element 816 that is selectable to view additional information related to the product. In one or more examples, the first user interface element 816 may be selectable to display a page or other user interface that includes additional information about the product. The third section 812 may also include a second user interface element 818 that is selectable to purchase the product. In one or more implementations, the second user interface element 818 may be selectable to initiate a transaction (e.g., checkout process) to purchase the product.

Although not shown in the illustrative example of FIG. 8, the user interface 800 may also include an additional user interface element that is selectable to share a version of the user content 808 that has been modified in relation to the third-party content 804. For example, at least one of the first section 802 or the second section 806 may include a user interface element that is selectable to share a modified version of the user content 808 using at least one of messaging functionality or social networking functionality of the client application.

Figure 9:
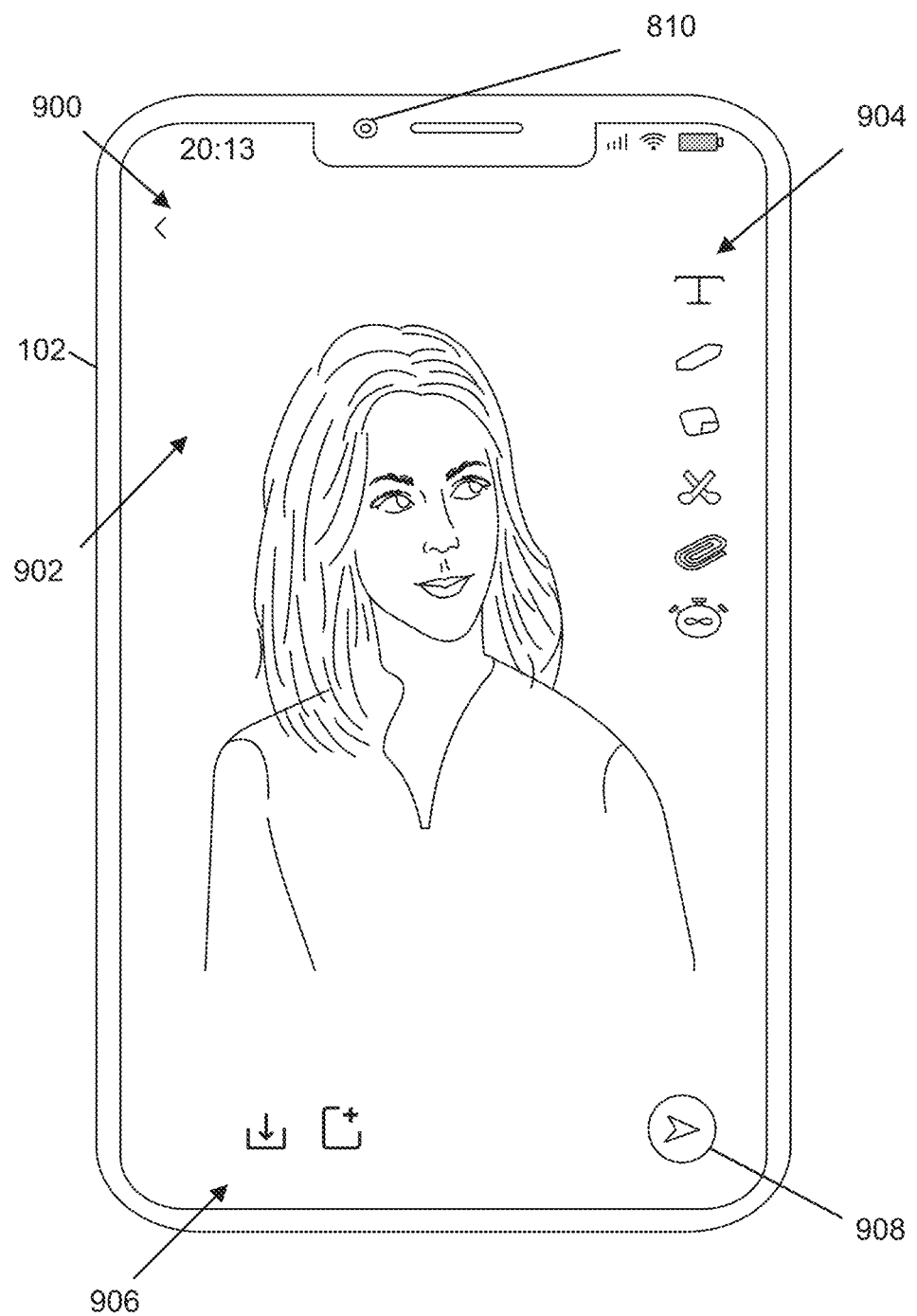
FIG. 9 is an illustration of a user interface to share content generated by combining third-party content with user content, according to one or more example implementations.

FIG. 9 is an illustration of a user interface 900 to share content 902 generated by combining third-party content with camera field of view content, according to one or more example implementations. The user interface 900 may be displayed via a display device of the client device 102 and produced by a client application executed by the client device 102, such as the client application 104. In various examples, the content 902 may be a modified version of content captured by the camera 810. For example, augmented reality content may be applied to user content to produce a modified version of the user content. In one or more illustrative examples, the content 902 may include modifications made to an appearance of a facial feature of an individual based on the third-party content 804 included in the user interface 800. The user interface 900 may also include one or more first user interface elements 904 that are individually selectable to modify the content 902. To illustrate, the first user interface elements 904 may include a user interface element that is selectable to add text content to the content 902, such as a caption. Additionally, the first user interface elements 904 may include a user interface element that is selectable to add an image overlay to the content 902, such as an image overlay related to a location of a user of the client application or a topic related to the content 902. In various examples, the one or more first user interface elements 904 may be selectable to apply a filter to the content 902. At least one of the one or more first user interface elements 904 may be selectable to launch one or more creative tools that may be used to modify the content 902. The one or more creative tools may include at least one of one or more drawing tools or one or more painting tools.

The user interface 900 may also include one or more second user interface elements 906. At least one of the second user interface elements 906 may be selectable to save the content 902 to memory of the client device 102. In addition, at least one of the second user interface elements 906 may be selectable to save the content 902 to a collection of content items related to a user of the client device 102. Further, the user interface 900 may include a third user interface element 908 that is selectable to share the content 902. In one or more examples, selection of the third user interface element 908 may generate an additional user interface that includes at least one of one or more recipients or one or more destinations for the content 902. In various examples, the third user interface element 908 may be selectable to generate a message to share the content 902. In one or more additional examples, the third user interface element 908 may be selectable to share the content 902 via a post to a social network of the user of the client application 104.

Figure 10:
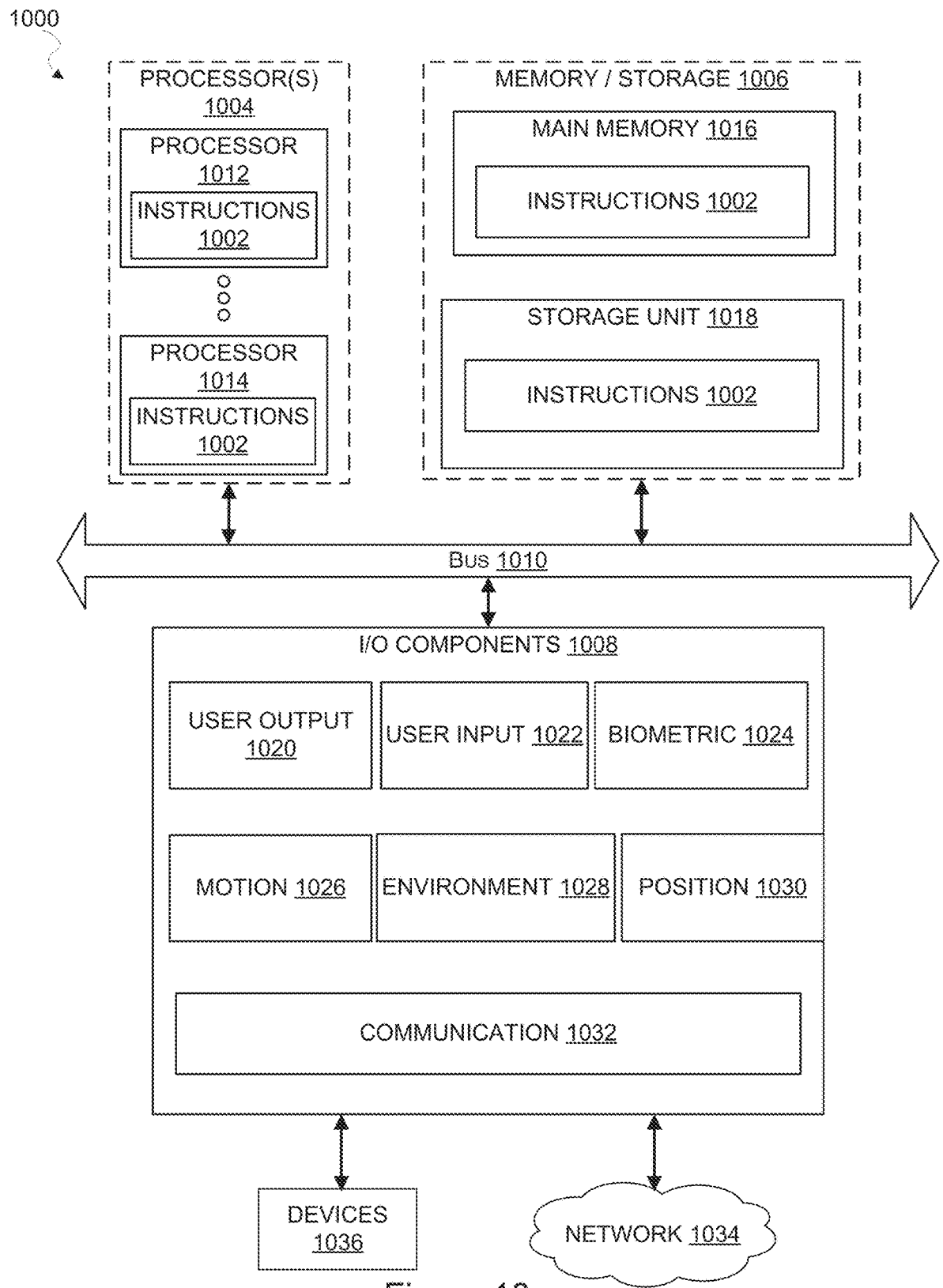
FIG. 10 is a block diagram illustrating components of a machine, in the form of a computer system, that may read and execute instructions from one or more machine-readable media to perform any one or more methodologies described herein, in accordance with one or more example implementations.

FIG. 10 is a block diagram illustrating components of a machine 1000, according to some example implementations, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1002 (e.g., software, a program, an application, an applet, an app, or other executable code) for causing the machine 1000 to perform any one or more of the methodologies discussed herein may be executed. As such, the instructions 1002 may be used to implement modules or components described herein. The instructions 1002 transform the general, non-programmed machine 1000 into a particular machine 1000 programmed to carry out the described and illustrated functions in the manner described. In alternative implementations, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1002, sequentially or otherwise, that specify actions to be taken by machine 1000. Further, while only a single machine 1000 is illustrated, the term "machine" shall also be taken to include a collection of machines that individually or jointly execute the instructions 1002 to perform any one or more of the methodologies discussed herein.

The machine 1000 may include processors 1004, memory/storage 1006, and I/O components 1008, which may be configured to communicate with each other such as via a bus 1010. In an example implementation, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1002. The term "processor" is intended to include multi-core processors 1004 that may comprise two or more independent processors (sometimes referred to as "cores") that may execute instructions 1002 contemporaneously. Although FIG. 10 shows multiple processors 1004, the machine 1000 may include a single processor 1012 with a single core, a single processor 1012 with multiple cores (e.g., a multi-core processor), multiple processors 1012, 1014 with a single core, multiple processors 1012, 1014 with multiple cores, or any combination thereof.

The memory/storage 1006 may include memory, such as a main memory 1016, or other memory storage, and a storage unit 1018, both accessible to the processors 1004 such as via the bus 1010. The storage unit 1018 and main memory 1016 store the instructions 1002 embodying any one or more of the methodologies or functions described herein. The instructions 1002 may also reside, completely or partially, within the main memory 1016, within the storage unit 1018, within at least one of the processors 1004 (e.g., within the processor's cache memory), or any suitable combination thereof, during execution thereof by the machine 1000. Accordingly, the main memory 1016, the storage unit 1018, and the memory of processors 1004 are examples of machine-readable media.

The I/O components 1008 may include a wide variety of components to receive input, provide output, produce output, transmit information, exchange information, capture measurements, and so on. The specific I/O components 1008 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1008 may include many other components that are not shown in FIG. 10. The I/O components 1008 are grouped according to functionality merely for simplifying the following discussion and the grouping is in no way limiting. In various example implementations, the I/O components 1008 may include user output components 1020 and user input components 1022. The user output components 1020 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1022 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 1008 may include biometric components 1024, motion components 1026, environmental components 1028, or position components 1030 among a wide array of other components. For example, the biometric components 1024 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1026 may include acceleration sensor components (e.g., accelerometer), gravitation sensor components, rotation sensor components (e.g., gyroscope), and so forth. The environmental components 1028 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1030 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 may include communication components 1032 operable to couple the machine 1000 to a network 1034 or devices 1036. For example, the communication components 1032 may include a network interface component or other suitable device to interface with the network 1034. In further examples, communication components 1032 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1036 may be another machine 1000 or any of a wide variety of peripheral devices (e.g., a peripheral device coupled via a USB).

Moreover, the communication components 1032 may detect identifiers or include components operable to detect identifiers. For example, the communication components 1032 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1032, such as location via Internet Protocol (IP) geo-location, location via Wi-Fi® signal triangulation, location via detecting an NFC beacon signal that may indicate a particular location, and so forth.

Figure 11:
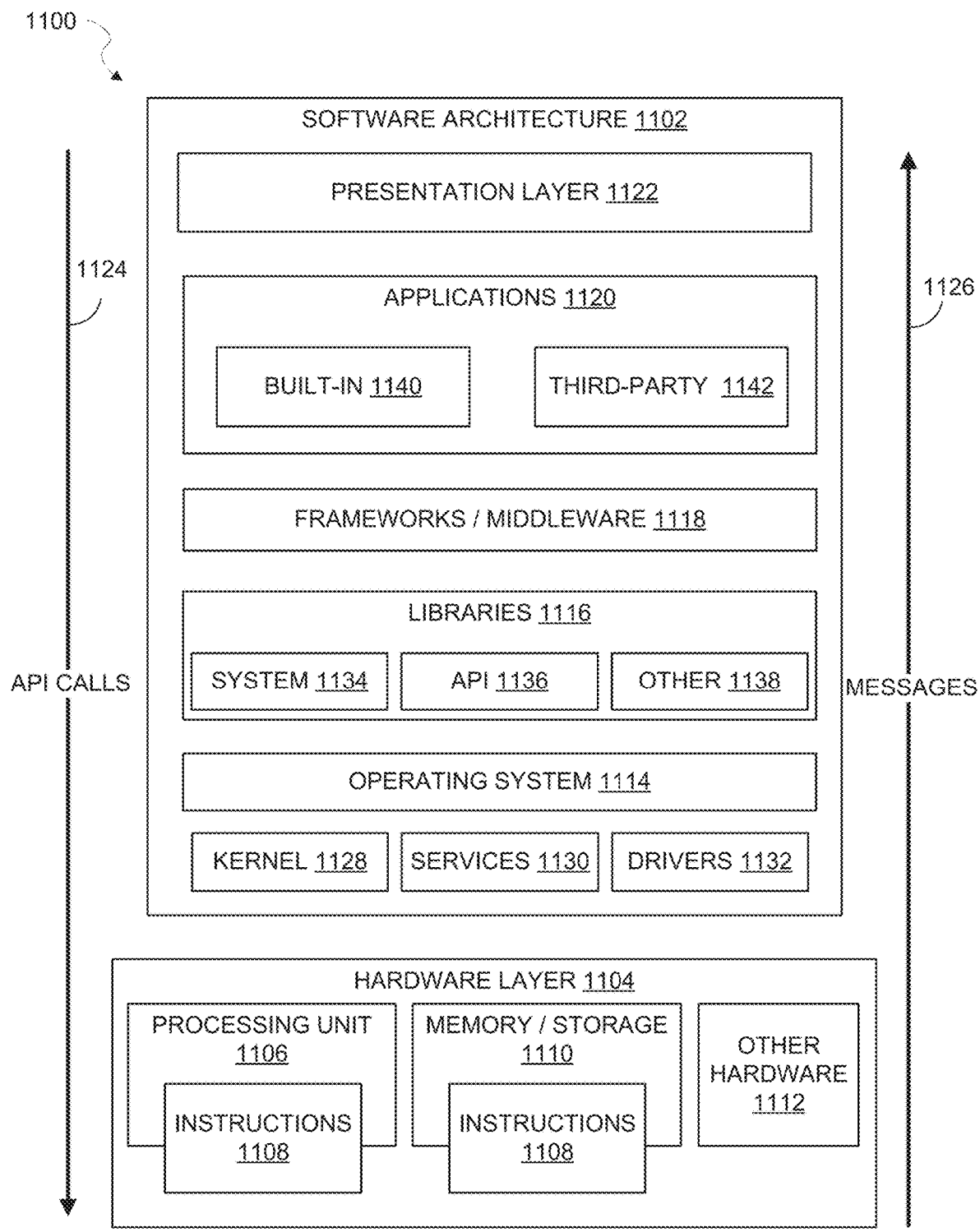
FIG. 11 is block diagram illustrating a representative software architecture that may be used in conjunction with one or more hardware architectures described herein, in accordance with one or more example implementations.

FIG. 11 is a block diagram illustrating system 1100 that includes an example software architecture 1102, which may be used in conjunction with various hardware architectures herein described. FIG. 11 is a non-limiting example of a software architecture and it will be appreciated that many other architectures may be implemented to facilitate the functionality described herein. The software architecture 1102 may execute on hardware such as machine 1000 of FIG. 10 that includes, among other things, processors 1004, memory/storage 1006, and input/output (I/O) components 1008. A representative hardware layer 1104 is illustrated and can represent, for example, the machine 1000 of FIG. 10. The representative hardware layer 1104 includes a processing unit 1106 having associated executable instructions 1108. Executable instructions 1108 represent the executable instructions of the software architecture 1102, including implementation of the methods, components, and so forth described herein. The hardware layer 1104 also includes at least one of memory or storage modules memory/storage 1110, which also have executable instructions 1108. The hardware layer 1104 may also comprise other hardware 1512.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1122. Operationally, the applications 1120 or other components within the layers may invoke API calls 1124 through the software stack and receive messages 1126 in response to the API calls 1124. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 are responsible for controlling or interfacing with the underlying hardware. For instance, the drivers 1132 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 provide a common infrastructure that is used by at least one of the applications 1120, other components, or layers. The libraries 1116 provide functionality that allows other software components to perform tasks in an easier fashion than to interface directly with the underlying operating system 1114 functionality (e.g., kernel 1128, services 1130, drivers 1132). The libraries 1116 may include system libraries 1134 (e.g., C standard library) that may provide functions such as memory allocation functions, string manipulation functions, mathematical functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 (also sometimes referred to as middleware) provide a higher-level common infrastructure that may be used by the applications 1120 or other software components/modules. For example, the frameworks/middleware 1118 may provide various graphical user interface functions, high-level resource management, high-level location services, and so forth. The frameworks/middleware 1118 may provide a broad spectrum of other APIs that may be utilized by the applications 1120 or other software components/modules, some of which may be specific to a particular operating system 1114 or platform.

The applications 1120 include built-in applications 1140 and third-party applications 1142. Examples of representative built-in applications 1140 may include, but are not limited to, a contacts application, a browser application, a book reader application, a location application, a media application, a messaging application, or a game application. Third-party applications 1142 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1142 may invoke the API calls 1124 provided by the mobile operating system (such as operating system 1114) to facilitate functionality described herein.

The applications 1120 may use built-in operating system functions (e.g., kernel 1128, services 1130, drivers 1132), libraries 1116, and frameworks/middleware 1118 to create UIs to interact with users of the system. Alternatively, or additionally, in some systems, interactions with a user may occur through a presentation layer, such as presentation layer 1122. In these systems, the application/component "logic" can be separated from the aspects of the application/component that interact with a user.

Glossary

"CARRIER SIGNAL," in this context, refers to any intangible medium that is capable of storing, encoding, or carrying transitory or non-transitory instructions 1002 for execution by the machine 1000, and includes digital or analog communications signals or other intangible medium to facilitate communication of such instructions 1002. Instructions 1002 may be transmitted or received over the network 110, 1034 using a transitory or non-transitory transmission medium via a network interface device and using any one of a number of well-known transfer protocols.

"CLIENT DEVICE," in this context, refers to any machine 1000 that interfaces to a communications network 110, 1034 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 110, 1034.

"COMMUNICATIONS NETWORK," in this context, refers to one or more portions of a network 110, 1034 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 110, 1034 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"MACHINE-READABLE MEDIUM," in this context, refers to a component, device, or other tangible media able to store instructions 1002 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" may be taken to include a single medium or multiple media (e.g., a centralized or distributed database, or associated caches and servers) able to store instructions 1002. The term "machine-readable medium" shall also be taken to include any medium, or combination of multiple media, that is capable of storing instructions 1002 (e.g., code) for execution by a machine 1000, such that the instructions 1002, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 1004 or other programmable processor. Once configured by such software, hardware components become specific machines (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor 1012, 1014 or processors 1004, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor 1012, 1014 or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 110 (e.g., the Internet) and via one or more appropriate interfaces (e.g., an API). The performance of certain of the operations may be distributed among the processors, not only residing within a single machine 1000, but deployed across a number of machines. In some example implementations, the processors 1004 or processor-implemented components may be located in a single geographic location (e.g., within a home environment, an office environment, or a server farm). In other example implementations, the processors 1004 or processor-implemented components may be distributed across a number of geographic locations.

"PROCESSOR," in this context, refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may, for example, be a CPU, a RISC processor, a CISC processor, a GPU, a DSP, an ASIC, a RFIC or any combination thereof. A processor 1004 may further be a multi-core processor having two or more independent processors 1004 (sometimes referred to as "cores") that may execute instructions 1002 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed implementations without departing from the scope of the present disclosure. These and other changes or modifications are intended to be included within the scope of the present disclosure, as expressed in the following claims.

What is claimed is:

1. A method comprising:
   capturing, by one or more computing devices, user content in a field of view of one or more cameras;
   determining, by at least one computing device of the one or more computing devices, augmented reality content to apply to the user content, the augmented reality content being related to a product available for purchase via a client application;
   determining, by at least one computing device of the one or more computing devices, one or more first objects included in the user content;
   determining, by at least one computing device of the one or more computing devices, that one or more second objects correspond to the one or more first objects, wherein the one or more second objects are related to effects produced in relation to the augmented reality content;
   determining, by at least one computing device of the one or more computing devices, one or more effects of the augmented reality content to apply to the one or more first objects; and
   generating, by at least one computing device of the one or more computing devices, modified user content that includes the one or more effects applied to the one or more first objects.

2. The method of claim 1, wherein determining the one or more first objects included in the user content includes:
   implementing one or more object recognition techniques with respect to the user content; and
   based on implementing the one or more object recognition techniques, determining a classification for each of the one or more first objects.

3. The method of claim 2, further comprising:
   determining that a second object of the one or more second objects corresponds to a first object of the one or more first objects based on a first classification of the first object corresponding to a second classification of the second object.

4. The method of claim 1, wherein:
   determining that the one or more second objects correspond to the one or more first objects includes performing an analysis of one or more features of the one or more second objects with respect to one or more additional features of the one or more first objects; and
   the method further comprises:
   determining, based on the analysis, a measure of similarity between the one or more first objects; and
   determining that the measure of similarity satisfies at least a threshold measure of similarity.

5. The method of claim 1, wherein:
   a first object of the one or more first objects includes a facial feature of an individual shown in the field of view of the one or more cameras;
   the method further comprises magnifying the facial feature to produce a magnified version of the facial feature; and
   an effect of the one or more effects is applied to the magnified version of the facial feature.

6. The method of claim 5, wherein the effect corresponds to at least one of a beauty product being applied to the facial feature or the beauty product being applied to an area of a face of the individual that is proximate to the facial feature.

7. The method of claim 1, wherein:
   the modified user content includes an image of a user of the client application that includes an effect of the one or more effects applied with respect to a facial feature of the user; and
   the method comprises:
   generating, via the client application, a message that includes the modified user content; and
   receiving input to send the message to a recipient.

8. The method of claim 7, further comprising:
   receiving, from an additional user of the client application, an additional message that includes additional modified user content, the additional modified user content including an image of the additional user and one or more additional effects applied to the additional user, the message including an option that is selectable to apply additional augmented reality content to additional image content of the user of the client application;
   receiving input indicating selection of the option;
   capturing additional user content in the field of view of the one or more cameras; and
   applying the additional augmented reality content to the additional user content to generate additional modified user content.

9. The method of claim 1, further comprising:
   generating a user interface that includes a first section and a second section, the first section including at least a portion of third-party content related to the product and the second section including at least one of image content or video content captured by the one or more cameras, the second section also including the one or more effects applied to the one or more first objects included in at least one of the image content or the video content captured by the one or more cameras.

10. A computing device comprising:
    one or more cameras;
    one or more hardware processors; and
    one or more non-transitory computer-readable storage media including computer-readable instructions that, when executed by the one or more hardware processors, cause the one or more hardware processors to perform operations comprising:
    capturing user content in a field of view of the one or more cameras;
    determining augmented reality content to apply to the user content, the augmented reality content being related to a product available for purchase via a client application;
    determining one or more first objects included in the user content;
    determining one or more second objects that correspond to the one or more first objects, wherein the one or more second objects are related to effects produced in relation to the augmented reality content;
    determining one or more effects of the augmented reality content to apply to the one or more first objects; and
    generating modified user content that includes the one or more effects applied to the one or more first objects.

11. The computing device of claim 10, wherein the one or more non-transitory computer-readable storage media include additional computer-readable instructions that, when executed by the one or more hardware processors, cause the one or more hardware processors to perform operations comprising:

sending the modified user content to a server system; and
sending a request to share the modified user content with a recipient, the recipient being a user of the client application.

12. The computing device of claim 10, wherein the user content corresponds to real-time content captured by the one or more cameras.

13. The computing device of claim 12, wherein the augmented reality content modifies at least one of color, texture, or shading of pixels of the one or more first objects, wherein the pixels correspond to a facial feature.

14. The computing device of claim 13, wherein the one or more non-transitory computer-readable storage media include additional computer-readable instructions that, when executed by the one or more hardware processors, cause the one or more hardware processors to perform operations comprising:

generating a user interface that includes a first section and a second section, the first section including at least a portion of third-party content related to the product and the second section including at least one of image content or video content captured by at least one camera, the second section also including the one or more effects applied to the facial feature.

15. The computing device of claim 14, wherein:
the one or more non-transitory computer-readable storage media include additional computer-readable instructions that, when executed by the one or more hardware processors, cause the one or more hardware processors to perform operations comprising magnifying the facial feature to produce a magnified version of the facial feature;
the one or more effects are applied to the magnified version of the facial feature; and
the user interface includes a third section that displays the magnified version of the facial feature.

16. The computing device of claim 14, wherein the first section includes a first user interface element selectable to display a page that includes additional information about the product and a second user interface element that is selectable to initiate a transaction to purchase the product.

17. The computing device of claim 10, wherein the augmented reality content includes timing data indicating timing of the one or more effects with respect to at least one of audio content or video content, and the one or more effects are applied to the one or more first objects according to the timing data.

18. One or more non-transitory computer-readable media comprising instructions that, when executed by one or more processors of a computing system, cause the computing system to perform operations comprising:

capturing user content in a field of view of one or more cameras;
determining augmented reality content to apply to the user content, the augmented reality content being related to a product available for purchase via a client application;
determining one or more first objects included in the user content;
determining one or more second objects that correspond to the one or more first objects, wherein the one or more second objects are related to effects produced in relation to the augmented reality content;
determining one or more effects of the augmented reality content to apply to the one or more first objects; and
generating modified user content that includes the one or more effects applied to the one or more first objects.

19. The one or more non-transitory computer-readable media of claim 18, comprising additional instructions that, when executed by one or more processors of a computing system, cause the computing system to perform additional operations comprising:

applying one or more machine learning techniques to determine that the one or more first objects include a facial feature that corresponds to one or more facial features included in the one or more second objects.

20. The one or more non-transitory computer-readable media of claim 18, comprising additional instructions that, when executed by one or more processors of a computing system, cause the computing system to perform additional operations comprising:

generating a user interface that includes a first section, a second section, and a third section, wherein:
the first section including at least a portion of third-party content related to the product;
the second section includes real-time content captured by the one or more cameras; and
the third section includes a magnified view of a facial feature included in the one or more first objects with the one or more effects being applied to the facial feature.

* * * * *